US012692945B2

(12) United States Patent
    Mullins et al.

(10) Patent No.:    US 12,692,945 B2
(45) **Date of Patent:        \*Jul. 28, 2026**

(54) SYSTEM AND METHOD FOR VALVE ASSEMBLY

(71) Applicant: Vulcan Industrial Holdings, LLC, Houston, TX (US)

(72) Inventors: Chance Ray Mullins, Spring, TX (US); Jason David Smith, Porter, TX (US); Steven Zachary Newberg, Houston, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/184,468

(22) Filed: Apr. 21, 2025

(65) Prior Publication Data

US 2025/0305586 A1     Oct. 2, 2025

Related U.S. Application Data

(63) Continuation of application No. 17/678,136, filed on Feb. 23, 2022, now Pat. No. 12,292,120.

(60) Provisional application No. 63/152,501, filed on Feb. 23, 2021.

(51) Int. Cl.
    *F16K 1/36*          (2006.01)
    *F04B 53/10*         (2006.01)
    *F04B 53/12*         (2006.01)
    *F16K 1/48*          (2006.01)

(52) U.S. Cl.
    CPC ............ *F16K 1/36* (2013.01); *F04B 53/1027* (2013.01); *F04B 53/127* (2013.01); *F16K 1/48* (2013.01)

(58) Field of Classification Search
    CPC .......... F16K 1/36; F16K 1/48; F04B 53/1027; F04B 53/103; F04B 53/129; F04B 53/10; F04B 53/125; F04B 53/127
    USPC ..................... 137/15.18, 15.23, 15.11, 15.27
    See application file for complete search history.

(56) References Cited

U.S. PATENT DOCUMENTS

| 1,316,539 | A | 9/1919 | Ford |
| 1,364,848 | A | 1/1921 | Walsh |
| 1,576,269 | A | 3/1926 | Durant |
| 1,595,459 | A | 8/1926 | Durant |
| 1,671,139 | A | 5/1928 | Wilson |
| 1,836,068 | A | 12/1931 | Goldsberry |
| 1,873,318 | A | 8/1932 | Eason |
| 1,914,737 | A | 6/1933 | Elms |

(Continued)

FOREIGN PATENT DOCUMENTS

| CN | 2550492 Y | 5/2003 |
| CN | 2556355 Y | 6/2003 |

(Continued)

OTHER PUBLICATIONS

U.S. Appl. No. 16/814,267, 194 pages.

(Continued)

*Primary Examiner* — Kelsey E Cary
(74) *Attorney, Agent, or Firm* — Womble Bond Dickinson (US) LLP

(57) ABSTRACT

A valve assembly includes an upper portion to be coupled to guide legs, a cavity being formed within one of the upper portion or the guide legs and a coupling member being associated with the other of the upper portion or the guide legs, wherein the upper portion is coupled to the guide legs via a single force application process.

18 Claims, 28 Drawing Sheets

(56)         References Cited

U.S. PATENT DOCUMENTS

| | | | |
|---|---|---|---|
| 1,948,628 | A | 2/1934 | Penick |
| 1,963,684 | A | 6/1934 | Shimer |
| 1,963,685 | A | 6/1934 | Shimer |
| 2,004,259 | A | 6/1935 | Weiger |
| 2,011,547 | A | 8/1935 | Campbell |
| 2,069,443 | A | 2/1937 | Hill |
| 2,103,504 | A | 12/1937 | White |
| 2,143,399 | A | 1/1939 | Abercrombie |
| 2,146,709 | A | 2/1939 | Bird |
| 2,151,442 | A | 3/1939 | Hardy |
| 2,163,472 | A | 6/1939 | Shimer |
| 2,252,488 | A | 8/1941 | Bierend |
| 2,304,991 | A | 12/1942 | Foster |
| 2,506,128 | A | 5/1950 | Ashton |
| 2,539,996 | A | 1/1951 | Gleitz |
| 2,547,831 | A | 4/1951 | Mueller |
| 2,713,522 | A | 7/1955 | Lorenz |
| 2,719,737 | A | 10/1955 | Fletcher |
| 2,745,631 | A | 5/1956 | Shellman |
| 2,756,960 | A | 7/1956 | Church |
| 2,898,082 | A | 8/1959 | Von Almen |
| 2,969,951 | A | 1/1961 | Walton |
| 2,977,874 | A | 4/1961 | Ritzerfeld et al. |
| 2,982,515 | A | 5/1961 | Clinton |
| 2,983,281 | A | 5/1961 | Bynum |
| 3,049,082 | A | 8/1962 | Barry |
| 3,053,500 | A | 9/1962 | Atkinson |
| 3,063,467 | A | 11/1962 | Roberts, Jr. |
| 3,120,960 | A | 2/1964 | Pippert et al. |
| 3,166,332 | A | 1/1965 | Olson |
| 3,191,617 | A | 6/1965 | Maddox |
| 3,224,817 | A | 12/1965 | Carter |
| 3,276,390 | A | 10/1966 | Bloudoff |
| 3,277,837 | A | 10/1966 | Pangburn |
| 3,288,475 | A | 11/1966 | Benoit |
| 3,459,363 | A | 8/1969 | Miller |
| 3,474,808 | A | 10/1969 | Elliott |
| 3,483,885 | A | 12/1969 | Leathers |
| 3,489,098 | A | 1/1970 | Roth |
| 3,489,170 | A | 1/1970 | Leman |
| 3,512,787 | A | 5/1970 | Kennedy |
| 3,590,387 | A | 6/1971 | Landis |
| 3,640,501 | A | 2/1972 | Walton |
| 3,652,098 | A | 3/1972 | Kawazu et al. |
| 3,698,726 | A | 10/1972 | Schettler |
| 3,738,665 | A | 6/1973 | Bilco |
| 3,785,659 | A | 1/1974 | Maurer et al. |
| 3,809,508 | A | 5/1974 | Uchiyama |
| 3,837,356 | A | 9/1974 | Selep et al. |
| 3,847,511 | A | 11/1974 | Cole |
| 3,907,307 | A | 9/1975 | Maurer |
| 3,920,252 | A | 11/1975 | Dechavanne |
| 3,931,755 | A | 1/1976 | Hatridge |
| 4,035,107 | A | 7/1977 | Kesten et al. |
| 4,044,834 | A | 8/1977 | Perkins |
| 4,076,212 | A | 2/1978 | Leman |
| 4,160,627 | A | 7/1979 | Cole |
| 4,161,187 | A | 7/1979 | Bauer |
| 4,184,814 | A | 1/1980 | Parker |
| 4,219,204 | A | 8/1980 | Pippert |
| 4,277,229 | A | 7/1981 | Pacht |
| 4,306,728 | A | 12/1981 | Huperz |
| 4,331,741 | A | 5/1982 | Wilson |
| 4,395,050 | A | 7/1983 | Wirz |
| 4,398,731 | A | 8/1983 | Gorman |
| 4,399,871 | A | 8/1983 | Adkins et al. |
| 4,406,336 | A | 9/1983 | Olsen |
| 4,440,404 | A | 4/1984 | Roach |
| 4,500,267 | A | 2/1985 | Birdwell |
| 4,508,133 | A | 4/1985 | Hamid |
| 4,518,359 | A | 5/1985 | Yao-Psong |
| 4,527,806 | A | 7/1985 | Ungchusri |
| 4,565,297 | A | 1/1986 | Korner |
| 4,580,791 | A | 4/1986 | DiRusso |
| 4,586,569 | A | 5/1986 | Hyde |
| 4,662,392 | A | 5/1987 | Vadasz |
| 4,716,924 | A | 1/1988 | Pacht |
| 4,754,950 | A | 7/1988 | Tada |
| 4,763,876 | A | 8/1988 | Oda |
| 4,768,933 | A | 9/1988 | Stachowiak |
| 4,770,206 | A | 9/1988 | Sjoberg |
| 4,807,890 | A | 2/1989 | Gorman |
| 4,811,758 | A | 3/1989 | Piper |
| 4,822,058 | A | 4/1989 | Butler et al. |
| 4,856,758 | A | 8/1989 | Knapp |
| 4,861,241 | A | 8/1989 | Gamboa |
| 4,872,395 | A | 10/1989 | Bennitt et al. |
| 4,878,815 | A | 11/1989 | Stachowiak |
| 4,911,410 | A | 3/1990 | Baker |
| 4,919,719 | A | 4/1990 | Abe |
| 4,928,921 | A | 5/1990 | Steele |
| 4,951,707 | A | 8/1990 | Johnson |
| 5,020,490 | A | 6/1991 | Seko |
| 5,052,435 | A | 10/1991 | Crudup |
| 5,061,159 | A | 10/1991 | Pryor |
| 5,062,450 | A | 11/1991 | Bailey |
| 5,073,096 | A | 12/1991 | King et al. |
| 5,080,713 | A | 1/1992 | Ishibashi |
| 5,088,521 | A | 2/1992 | Johnson |
| 5,127,807 | A | 7/1992 | Eslinger |
| 5,131,666 | A | 7/1992 | Hutchens |
| 5,135,238 | A | 8/1992 | Wells |
| 5,149,107 | A | 9/1992 | Maringer |
| 5,201,491 | A | 4/1993 | Domangue |
| 5,209,495 | A | 5/1993 | Palmour |
| 5,249,600 | A | 10/1993 | Blume |
| 5,267,736 | A | 12/1993 | Pietsch |
| 5,273,570 | A | 12/1993 | Sato |
| 5,284,320 | A | 2/1994 | Michael et al. |
| 5,297,805 | A | 3/1994 | Merkin |
| 5,299,812 | A | 4/1994 | Brestel |
| 5,314,659 | A | 5/1994 | Hidaka |
| 5,316,086 | A | 5/1994 | DeMoss |
| 5,362,215 | A | 11/1994 | King |
| 5,370,362 | A | 12/1994 | Kent et al. |
| 5,382,057 | A | 1/1995 | Richter |
| 5,398,715 | A | 3/1995 | Pacht |
| 5,478,048 | A | 12/1995 | Salesky |
| 5,493,951 | A | 2/1996 | Harrison |
| 5,526,878 | A | 6/1996 | Duell et al. |
| 5,533,245 | A | 7/1996 | Stanton |
| 5,540,570 | A | 7/1996 | Schuller |
| 5,549,160 | A | 8/1996 | Bownes et al. |
| 5,572,920 | A | 11/1996 | Kennedy |
| 5,593,166 | A | 1/1997 | Lovell et al. |
| 5,622,371 | A | 4/1997 | Angelo |
| 5,626,345 | A | 5/1997 | Wallace |
| 5,636,688 | A | 6/1997 | Bassinger |
| 5,674,449 | A | 10/1997 | Liang |
| 5,806,858 | A | 9/1998 | Harrelson, III |
| 5,823,510 | A | 10/1998 | Muramatsu et al. |
| 5,834,664 | A | 11/1998 | Aonuma |
| 5,859,376 | A | 1/1999 | Ishibashi |
| 5,895,517 | A | 4/1999 | Kawamura |
| 5,924,853 | A | 7/1999 | Pacht |
| 5,949,003 | A | 9/1999 | Aoki |
| 5,957,208 | A | 9/1999 | Schnatzmeyer |
| 6,004,372 | A | 12/1999 | Quets |
| 6,070,608 | A | 6/2000 | Pringle |
| 6,125,810 | A | 10/2000 | Haselkorn |
| 6,139,599 | A | 10/2000 | Takahashi |
| 6,200,688 | B1 | 3/2001 | Liang |
| 6,209,445 | B1 | 4/2001 | Roberts, Jr. |
| 6,251,157 | B1 | 6/2001 | Aoki et al. |
| 6,328,112 | B1 | 12/2001 | Malone |
| 6,328,312 | B1 | 12/2001 | Schmitz |
| 6,340,377 | B1 | 1/2002 | Kawata |
| 6,382,940 | B1 | 5/2002 | Blume |
| 6,386,548 | B1 | 5/2002 | Grimanis et al. |
| 6,422,317 | B1 | 7/2002 | Williamson, Jr. |
| 6,431,521 | B1 | 8/2002 | Jones |
| 6,436,338 | B1 | 8/2002 | Qiao |
| 6,446,939 | B1 | 9/2002 | Hoppe |
| 6,454,015 | B1 | 9/2002 | Armstrong et al. |

(56) References Cited

U.S. PATENT DOCUMENTS

| | | |
|---|---|---|
| 6,460,620 B1 | 10/2002 | LaFleur |
| 6,464,749 B1 | 10/2002 | Kawase |
| 6,482,275 B1 | 11/2002 | Qiao |
| 6,485,678 B1 | 11/2002 | Liang |
| 6,544,012 B1 | 4/2003 | Blume |
| 6,571,684 B1 | 6/2003 | Nov et al. |
| 6,623,259 B1 | 9/2003 | Blume |
| 6,634,236 B2 | 10/2003 | Mars |
| 6,641,112 B2 | 11/2003 | Antoff |
| 6,695,007 B2 | 2/2004 | Vicars |
| 6,702,905 B1 | 3/2004 | Qiao |
| 6,712,871 B2 | 3/2004 | Oh |
| 6,715,558 B2 | 4/2004 | Williamson |
| 6,715,693 B1 | 4/2004 | Dam et al. |
| 6,796,321 B2 | 9/2004 | Vicars |
| 6,880,802 B2 | 4/2005 | Hara |
| 6,910,871 B1 | 6/2005 | Blume |
| 6,916,444 B1 | 7/2005 | Liang |
| 6,951,165 B2 | 10/2005 | Kuhn |
| 6,951,579 B2 | 10/2005 | Koyama |
| 6,955,181 B1 | 10/2005 | Blume |
| 6,959,732 B2 | 11/2005 | Cotton, III et al. |
| 6,959,916 B2 | 11/2005 | Chigasaki |
| 7,000,632 B2 | 2/2006 | McIntire |
| 7,028,928 B2 | 4/2006 | Shinogle |
| 7,036,824 B2 | 5/2006 | Kunz |
| 7,144,440 B2 | 12/2006 | Ando |
| 7,168,440 B1 | 1/2007 | Blume |
| 7,186,097 B1 | 3/2007 | Blume |
| 7,222,837 B1 | 5/2007 | Blume |
| 7,290,560 B2 | 11/2007 | Orr |
| 7,296,591 B2 | 11/2007 | Moe |
| 7,335,002 B2 | 2/2008 | Vicars |
| 7,341,435 B2 | 3/2008 | Vicars |
| 7,398,955 B2 | 7/2008 | Weingarten |
| 7,506,574 B2 | 3/2009 | Jensen |
| 7,513,483 B1 | 4/2009 | Blume |
| 7,513,759 B1 | 4/2009 | Blume |
| 7,520,329 B2 | 4/2009 | Reid et al. |
| 7,562,675 B2 | 7/2009 | Nomichi et al. |
| 7,572,312 B2 | 8/2009 | Kawata et al. |
| 7,611,590 B2 | 11/2009 | Liang |
| 7,681,589 B2 | 3/2010 | Schwegman |
| 7,682,471 B2 | 3/2010 | Levin |
| 7,726,026 B1 | 6/2010 | Blume |
| 7,748,310 B2 | 7/2010 | Kennedy |
| 7,754,142 B2 | 7/2010 | Liang |
| 7,754,143 B2 | 7/2010 | Qiao |
| 7,757,396 B2 | 7/2010 | Sawada |
| 7,789,133 B2 | 9/2010 | McGuire |
| 7,789,161 B2 | 9/2010 | Riley |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,931,078 B2 | 4/2011 | Toporowski et al. |
| 7,954,510 B2 | 6/2011 | Schwegman |
| 7,992,635 B2 | 8/2011 | Cherewyk |
| 8,020,638 B2 | 9/2011 | Chellappa et al. |
| 8,069,923 B2 | 12/2011 | Blanco |
| 8,075,000 B2 | 12/2011 | James et al. |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,146,889 B2 | 4/2012 | Hunter |
| 8,147,227 B1 | 4/2012 | Blume |
| 8,181,970 B2 | 5/2012 | Smith |
| 8,201,832 B2 | 6/2012 | Kocurek |
| 8,261,771 B2 | 9/2012 | Witkowski |
| 8,287,256 B2 | 10/2012 | Shafer |
| 8,291,927 B2 | 10/2012 | Johnson |
| 8,292,301 B1 | 10/2012 | Gilstad et al. |
| 8,312,805 B1 | 11/2012 | Blume |
| 8,317,498 B2 | 11/2012 | Gambier |
| 8,328,202 B2 | 12/2012 | Foster et al. |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,529,230 B1 | 9/2013 | Colley, III et al. |
| 8,534,691 B2 | 9/2013 | Schaffer |
| 8,613,886 B2 | 12/2013 | Qiao |
| D700,682 S | 3/2014 | Bayyouk et al. |
| 8,662,864 B2 | 3/2014 | Bayyouk |
| 8,662,865 B2 | 3/2014 | Bayyouk |
| 8,668,012 B2 | 3/2014 | Porter et al. |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,814,139 B2 | 8/2014 | Griffin et al. |
| 8,814,432 B2 | 8/2014 | Thoma et al. |
| 8,828,312 B2 | 9/2014 | Yao |
| 8,870,554 B2 | 10/2014 | Kent |
| 8,888,069 B2 | 11/2014 | Maruno et al. |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,955,850 B2 | 2/2015 | Saucerman et al. |
| 8,978,695 B2 | 3/2015 | Witkowkski |
| 8,998,593 B2 | 4/2015 | Vicars |
| 9,010,412 B2 | 4/2015 | McGuire |
| 9,016,693 B1 | 4/2015 | Shek et al. |
| 9,067,346 B2 | 6/2015 | Kohn et al. |
| 9,103,448 B2 | 8/2015 | Witkowski |
| 9,121,503 B2 | 9/2015 | Dietle et al. |
| 9,150,945 B2 | 10/2015 | Bei |
| 9,157,136 B2 | 10/2015 | Chou |
| 9,157,297 B2 | 10/2015 | Williamson, Jr. |
| 9,157,468 B2 | 10/2015 | Dille |
| 9,188,242 B2 | 11/2015 | Giove et al. |
| 9,206,910 B2 | 12/2015 | Kahn |
| D748,228 S | 1/2016 | Bayyouk |
| 9,243,630 B2 | 1/2016 | Foote |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,341,039 B2 | 5/2016 | Galle et al. |
| 9,341,272 B2 | 5/2016 | Hoang |
| 9,359,921 B2 | 6/2016 | Hashimoto |
| 9,360,115 B2 | 6/2016 | Chaplin et al. |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,410,396 B2 | 8/2016 | MØgedal |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,349 B2 | 12/2016 | Zimmerman |
| 9,528,508 B2 | 12/2016 | Thomeer |
| 9,528,631 B2 | 12/2016 | McCarty |
| 9,534,473 B2 | 1/2017 | Morris |

(56) References Cited

U.S. PATENT DOCUMENTS

| | | | |
|---|---|---|---|
| 9,534,691 | B2 | 1/2017 | Miller |
| 9,556,761 | B2 | 1/2017 | Koyama |
| 9,568,138 | B2 | 2/2017 | Arizpe |
| 9,605,767 | B2 | 3/2017 | Chhabra |
| 9,631,739 | B2 | 4/2017 | Belshan |
| D787,029 | S | 5/2017 | Bayyouk |
| 9,638,075 | B2 | 5/2017 | Qiao |
| 9,638,337 | B2 | 5/2017 | Witkowski |
| 9,650,882 | B2 | 5/2017 | Zhang |
| 9,651,067 | B2 | 5/2017 | Beschorner |
| 9,677,378 | B2 | 6/2017 | Asthana et al. |
| 9,689,364 | B2 | 6/2017 | Mack |
| 9,695,812 | B2 | 7/2017 | Dille |
| 9,732,746 | B2 | 8/2017 | Chandrasekaran |
| 9,732,880 | B2 | 8/2017 | Haines |
| 9,745,968 | B2 | 8/2017 | Kotapish |
| 9,784,262 | B2 | 10/2017 | Bayyouk |
| 9,791,082 | B2 | 10/2017 | Baxter et al. |
| 9,816,348 | B2 | 11/2017 | Asthana et al. |
| 9,822,606 | B2 | 11/2017 | Williamson, Jr. |
| 9,822,894 | B2 | 11/2017 | Bayyouk |
| 9,845,801 | B1 | 12/2017 | Shek |
| 9,857,807 | B2 | 1/2018 | Baca |
| 9,915,250 | B2 | 3/2018 | Brasche |
| 9,920,615 | B2 | 3/2018 | Zhang |
| 9,927,036 | B2 | 3/2018 | Dille |
| 9,945,362 | B2 | 4/2018 | Skurdalsvold |
| 9,945,375 | B2 | 4/2018 | Zhang |
| 9,957,770 | B2 | 5/2018 | Averill et al. |
| 9,976,401 | B2 | 5/2018 | Walton et al. |
| 9,989,044 | B2 | 6/2018 | Bayyouk |
| 10,029,540 | B2 | 7/2018 | Seeger |
| D826,281 | S | 8/2018 | Mead |
| 10,041,490 | B1 | 8/2018 | Jahnke |
| 10,082,137 | B2 | 9/2018 | Graham |
| 10,094,478 | B2 | 10/2018 | Iijima |
| 10,113,679 | B2 | 10/2018 | Shuck |
| 10,145,205 | B2 | 12/2018 | Martino et al. |
| 10,180,058 | B2 | 1/2019 | Carter |
| 10,184,470 | B2 | 1/2019 | Barnett, Jr. |
| 10,190,197 | B2 | 1/2019 | Baker |
| 10,197,172 | B2 | 2/2019 | Fuller |
| 10,203,037 | B2 | 2/2019 | Hunter et al. |
| 10,215,172 | B2 | 2/2019 | Wood |
| 10,221,848 | B2 | 3/2019 | Bayyouk |
| 10,240,594 | B2 | 3/2019 | Barnhouse, Jr. |
| 10,240,597 | B2 | 3/2019 | Bayyouk |
| 10,247,182 | B2 | 4/2019 | Zhang |
| 10,247,184 | B2 | 4/2019 | Chunn |
| 10,260,634 | B2 | 4/2019 | Lenhert et al. |
| 10,273,954 | B2 | 4/2019 | Brown |
| 10,288,178 | B2 | 5/2019 | Nowell |
| 10,309,182 | B2 | 6/2019 | Jones et al. |
| 10,316,832 | B2 | 6/2019 | Byrne |
| 10,330,097 | B2 | 6/2019 | Skurdalsvold |
| 10,344,757 | B1 | 7/2019 | Stark |
| 10,364,487 | B2 | 7/2019 | Park |
| D856,498 | S | 8/2019 | Bayyouk |
| 10,378,535 | B2 | 8/2019 | Mahmood |
| 10,378,538 | B2 | 8/2019 | Blume |
| 10,378,659 | B2 | 8/2019 | Scott et al. |
| 10,393,113 | B2 | 8/2019 | Wagner |
| 10,400,764 | B2 | 9/2019 | Wagner |
| 10,415,348 | B2 | 9/2019 | Zhang |
| 10,415,719 | B2 | 9/2019 | Leboeuf et al. |
| D861,834 | S | 10/2019 | Foster et al. |
| D864,691 | S | 10/2019 | Campos |
| 10,428,406 | B2 | 10/2019 | Yao |
| 10,428,949 | B2 | 10/2019 | Miller |
| 10,435,987 | B2 | 10/2019 | Poluchalla et al. |
| 10,436,193 | B1 | 10/2019 | Jahnke |
| 10,443,456 | B2 | 10/2019 | Hoeg |
| 10,465,680 | B1 | 11/2019 | Guerra |
| 10,472,702 | B2 | 11/2019 | Yeh |
| 10,487,528 | B2 | 11/2019 | Pozybill |
| D871,455 | S | 12/2019 | Crowsley |
| 10,519,070 | B2 | 12/2019 | Sanders |
| 10,519,950 | B2 | 12/2019 | Foster |
| 10,526,862 | B2 | 1/2020 | Witkowski |
| 10,527,036 | B2 | 1/2020 | Blume |
| 10,533,240 | B2 | 1/2020 | Veliz et al. |
| 10,557,446 | B2 | 2/2020 | Stecklein |
| 10,557,576 | B2 | 2/2020 | Witkowski |
| 10,557,580 | B2 | 2/2020 | Mendyk |
| 10,563,494 | B2 | 2/2020 | Graham |
| 10,563,649 | B2 | 2/2020 | Zhang |
| 10,570,491 | B2 | 2/2020 | Hong |
| 10,576,538 | B2 | 3/2020 | Kato |
| 10,577,580 | B2 | 3/2020 | Abbas |
| 10,577,850 | B2 | 3/2020 | Ozkan |
| 10,591,070 | B2 | 3/2020 | Nowell |
| 10,605,374 | B2 | 3/2020 | Takaki |
| D880,661 | S | 4/2020 | Foster et al. |
| D881,958 | S | 4/2020 | Han |
| 10,626,856 | B2 | 4/2020 | Coldren |
| 10,628,744 | B2 | 4/2020 | Surjaatmadja et al. |
| 10,633,925 | B2 | 4/2020 | Panda |
| 10,634,260 | B2 | 4/2020 | Said |
| 10,640,854 | B2 | 5/2020 | Hu |
| 10,655,623 | B2 | 5/2020 | Blume |
| 10,655,743 | B2 | 5/2020 | Hagen |
| 10,663,071 | B2 | 5/2020 | Bayyouk |
| 10,670,013 | B2 | 6/2020 | Foster |
| 10,670,153 | B2 | 6/2020 | Filipow |
| 10,670,176 | B2 | 6/2020 | Byrne |
| 10,677,109 | B2 | 6/2020 | Qiao |
| 10,677,240 | B2 | 6/2020 | Graham |
| 10,677,365 | B2 | 6/2020 | Said |
| 10,711,567 | B2 | 7/2020 | Buckley |
| 10,711,754 | B2 | 7/2020 | Nelson |
| 10,711,778 | B2 | 7/2020 | Buckley |
| 10,718,441 | B2 | 7/2020 | Myers |
| D893,684 | S | 8/2020 | Matthys |
| 10,731,523 | B2 | 8/2020 | Qu |
| 10,731,643 | B2 | 8/2020 | DeLeon |
| 10,738,928 | B2 | 8/2020 | Arizpe |
| 10,753,490 | B2 | 8/2020 | Fuller |
| 10,753,495 | B2 | 8/2020 | Bayyouk |
| D895,777 | S | 9/2020 | Chase |
| 10,760,567 | B2 | 9/2020 | Salih et al. |
| 10,767,520 | B1 | 9/2020 | Hattiangadi |
| 10,771,567 | B2 | 9/2020 | Sundaresan |
| 10,774,828 | B1 | 9/2020 | Smith |
| 10,781,803 | B2 | 9/2020 | Kumar |
| 10,787,725 | B2 | 9/2020 | Fujieda |
| 10,801,627 | B2 | 10/2020 | Warbey |
| 10,808,488 | B2 | 10/2020 | Witkowski |
| 10,808,851 | B1 | 10/2020 | Surjaatmadja et al. |
| 10,815,988 | B2 | 10/2020 | Buckley |
| 10,815,989 | B2 | 10/2020 | Naedler et al. |
| 10,830,360 | B2 | 11/2020 | Frank |
| 10,837,556 | B2 | 11/2020 | Chase et al. |
| 10,851,775 | B2 | 12/2020 | Stark |
| 10,865,325 | B2 | 12/2020 | Nakao |
| 10,895,325 | B2 | 1/2021 | Nowell et al. |
| D910,820 | S | 2/2021 | Grassl |
| 10,907,738 | B2 | 2/2021 | Nowell |
| 10,914,171 | B2 | 2/2021 | Foster |
| 10,914,383 | B2 | 2/2021 | Kustermans et al. |
| 10,934,899 | B2 | 3/2021 | Hattiangadi |
| 10,941,765 | B2 | 3/2021 | Nowell |
| 10,941,866 | B2 | 3/2021 | Nowell |
| 10,954,938 | B2 | 3/2021 | Stark |
| 10,961,607 | B2 | 3/2021 | Oshima |
| 10,962,001 | B2 | 3/2021 | Nowell |
| D915,197 | S | 4/2021 | Katano |
| D916,240 | S | 4/2021 | Nowell |
| 10,968,717 | B2 | 4/2021 | Tran |
| 10,988,834 | B2 | 4/2021 | Lee |
| 10,989,321 | B2 | 4/2021 | Hattiangadi |
| 10,995,738 | B2 | 5/2021 | Blume |
| 11,002,120 | B1 | 5/2021 | Surjaatmadja |
| 11,009,016 | B2 | 5/2021 | Berend |
| 11,028,662 | B2 | 6/2021 | Rhodes |

(56) References Cited

U.S. PATENT DOCUMENTS

| | | |
|---|---|---|
| 11,041,570 B1 | 6/2021 | Buckley |
| 11,073,144 B1 | 7/2021 | Hurst et al. |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,149,856 B2 | 10/2021 | Mattoni et al. |
| 11,156,221 B2 | 10/2021 | Stark et al. |
| 11,162,479 B2 | 11/2021 | Thomas et al. |
| 11,162,859 B2 | 11/2021 | Lei |
| 11,173,590 B2 | 11/2021 | Tyler |
| 11,181,101 B2 | 11/2021 | Byrne |
| 11,181,108 B2 | 11/2021 | Brooks |
| 11,225,963 B2 | 1/2022 | Naedler et al. |
| 11,231,111 B2 | 1/2022 | Hurst |
| 11,242,849 B1 | 2/2022 | Smith |
| 11,286,737 B2 | 3/2022 | Gunasekaran |
| D949,202 S | 4/2022 | Sharpstone |
| 11,300,111 B2 | 4/2022 | Thomas et al. |
| 11,313,189 B2 | 4/2022 | Dawsey et al. |
| 11,333,249 B2 | 5/2022 | Jones et al. |
| 11,353,117 B1 | 6/2022 | Smith |
| 11,359,615 B2 | 6/2022 | Thomas et al. |
| 11,384,756 B1 | 7/2022 | Smith |
| 11,391,374 B1 | 7/2022 | Ellisor |
| 11,421,679 B1 | 8/2022 | Mullins |
| 11,421,680 B1 | 8/2022 | Smith |
| 11,434,714 B2 | 9/2022 | Machocki |
| 11,434,900 B1 | 9/2022 | Alex |
| 11,441,683 B2 | 9/2022 | Mullins et al. |
| 11,454,083 B2 | 9/2022 | Asthana et al. |
| 11,454,321 B2 | 9/2022 | Mullins et al. |
| 11,473,395 B2 | 10/2022 | Yeldell et al. |
| 11,473,686 B2 | 10/2022 | Bayyouk |
| 11,512,545 B2 | 11/2022 | Yuan et al. |
| 11,519,225 B2 | 12/2022 | Winslow et al. |
| 11,566,481 B2 | 1/2023 | Chambers et al. |
| 11,566,713 B2 | 1/2023 | Poremski |
| 11,566,718 B2 | 1/2023 | Singley et al. |
| D980,876 S | 3/2023 | Smith |
| 11,608,896 B2 | 3/2023 | Al-Darra |
| D986,928 S | 5/2023 | Smith et al. |
| 11,644,106 B2 | 5/2023 | Williams et al. |
| 11,668,163 B2 | 6/2023 | Asthana et al. |
| 11,692,544 B2 | 7/2023 | Chase |
| D997,992 S | 9/2023 | Smith et al. |
| 11,746,778 B2 | 9/2023 | Bayyouk |
| 11,761,441 B1 | 9/2023 | Alex et al. |
| D1,006,059 S | 11/2023 | Waniek |
| 11,840,453 B2 | 12/2023 | Vlassoff et al. |
| 11,846,356 B1 | 12/2023 | Ellisor |
| 11,859,723 B2 | 1/2024 | Surjaatmadja et al. |
| 11,891,988 B2 | 2/2024 | Mullins et al. |
| 11,898,408 B2 | 2/2024 | Jamison et al. |
| 11,913,447 B1 | 2/2024 | Wiegand et al. |
| 11,920,684 B1 | 3/2024 | Xu et al. |
| 11,938,592 B2 | 3/2024 | Dearborn et al. |
| D1,022,145 S | 4/2024 | Meyers |
| 11,952,865 B2 | 4/2024 | Fripp et al. |
| 11,988,294 B2 | 5/2024 | Qiao et al. |
| D1,031,952 S | 6/2024 | Huntley |
| 12,018,759 B1 | 6/2024 | Patel et al. |
| D1,036,632 S | 7/2024 | Suzuki |
| 12,038,086 B2 | 7/2024 | Shuck |
| 12,049,889 B2 | 7/2024 | Ellisor et al. |
| D1,039,657 S | 8/2024 | Cox |
| 12,055,221 B2 | 8/2024 | Ellisor et al. |
| 12,092,226 B2 | 9/2024 | Elliott et al. |
| 12,092,227 B1 | 9/2024 | Belshan |
| 12,140,005 B2 | 11/2024 | Brown et al. |
| 12,140,240 B1 | 11/2024 | Xu |
| D1,061,623 S | 2/2025 | Newberg et al. |
| D1,063,005 S | 2/2025 | Lorkowski |
| 12,247,557 B2 | 3/2025 | Avey et al. |
| 12,247,561 B2 | 3/2025 | Avey et al. |
| 12,263,503 B2 | 4/2025 | Mittag et al. |
| 12,263,549 B2 | 4/2025 | Noreiga et al. |
| 12,270,394 B2 | 4/2025 | Ellisor et al. |
| 12,270,477 B2 | 4/2025 | Pauchet et al. |
| 12,292,120 B1 | 5/2025 | Mullins et al. |
| 12,292,121 B2 | 5/2025 | Berryhill |
| 12,297,922 B1 | 5/2025 | Xu |
| 12,345,253 B2 | 7/2025 | Mullins et al. |
| 12,345,332 B2 | 7/2025 | Ellisor |
| 12,366,244 B2 | 7/2025 | Alex et al. |
| 12,366,245 B1 | 7/2025 | Ellisor et al. |
| 12,404,931 B2 | 9/2025 | Ellisor et al. |
| 12,404,942 B2 | 9/2025 | Hurst et al. |
| 12,460,488 B2 | 11/2025 | Uddin et al. |
| 12,473,910 B2 | 11/2025 | Foster et al. |
| 12,480,489 B2 | 11/2025 | Ellisor et al. |
| 12,486,901 B1 | 12/2025 | Naedler |
| 12,498,051 B2 | 12/2025 | Xu et al. |
| 12,510,164 B1 | 12/2025 | Mullins et al. |
| D1,113,987 S | 2/2026 | Mullins et al. |
| 12,540,673 B2 | 2/2026 | Ellisor |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0108116 A1 | 6/2004 | McLoughlin et al. |
| 2004/0161351 A1 | 8/2004 | Forrest |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0098963 A1 | 5/2005 | Olsen |
| 2005/0126638 A1 | 6/2005 | Gilbert |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0261746 A1 | 11/2007 | Nomichi et al. |
| 2007/0273105 A1 | 11/2007 | Stanton |
| 2007/0295411 A1 | 12/2007 | Schwegman |
| 2008/0031769 A1 | 2/2008 | Yeh |
| 2008/0042369 A1 | 2/2008 | Krywitsky et al. |
| 2008/0052014 A1 | 2/2008 | Toyosada |
| 2008/0092384 A1 | 4/2008 | Schaake |
| 2008/0240949 A1 | 10/2008 | Tackett et al. |
| 2008/0279706 A1 | 11/2008 | Gambier |
| 2009/0041611 A1 | 2/2009 | Sathian |
| 2009/0166980 A1 | 7/2009 | Miller et al. |
| 2009/0261575 A1 | 10/2009 | Bull |
| 2009/0278069 A1 | 11/2009 | Blanco |
| 2009/0289209 A1 | 11/2009 | Comeaux et al. |
| 2010/0143163 A1 | 6/2010 | Patel et al. |
| 2010/0230628 A1 | 9/2010 | Stefina |
| 2010/0242720 A1 | 9/2010 | Matzner |
| 2010/0272597 A1 | 10/2010 | Qiao |
| 2011/0079302 A1 | 4/2011 | Hawes |
| 2011/0142701 A1 | 6/2011 | Small |
| 2011/0173814 A1 | 7/2011 | Patel |
| 2011/0189040 A1 | 8/2011 | Vicars |
| 2011/0255993 A1 | 10/2011 | Ochoa |
| 2011/0266752 A1 | 11/2011 | Kocurek |
| 2011/0296982 A1 | 12/2011 | Dille et al. |
| 2012/0141308 A1 | 6/2012 | Saini |
| 2012/0157786 A1 | 6/2012 | Pribanic |

(56) References Cited

U.S. PATENT DOCUMENTS

| | | |
|---|---|---|
| 2012/0163969 A1 | 6/2012 | Ongole |
| 2012/0259593 A1 | 10/2012 | El-Zein |
| 2012/0292550 A1 | 11/2012 | Meek |
| 2012/0304821 A1 | 12/2012 | Ando |
| 2013/0020521 A1 | 1/2013 | Byrne |
| 2013/0037739 A1 | 2/2013 | Millard |
| 2013/0202457 A1 | 8/2013 | Bayyouk |
| 2013/0202458 A1 | 8/2013 | Byrne |
| 2013/0263932 A1 | 10/2013 | Baxter et al. |
| 2013/0319220 A1 | 12/2013 | Luharuka |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0260954 A1 | 9/2014 | Young |
| 2014/0264134 A1 | 9/2014 | Butler et al. |
| 2014/0286805 A1 | 9/2014 | Dyer |
| 2014/0319780 A1 | 10/2014 | Vertenten |
| 2014/0322034 A1 | 10/2014 | Bayyouk |
| 2014/0322050 A1 | 10/2014 | Marette et al. |
| 2014/0348677 A1 | 11/2014 | Moeller |
| 2015/0060715 A1 | 3/2015 | Hoang |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |
| 2015/0219096 A1 | 8/2015 | Jain |
| 2015/0300332 A1 | 10/2015 | Kotapish |
| 2015/0353856 A1 | 12/2015 | Kleyman et al. |
| 2015/0368775 A1 | 12/2015 | Baker |
| 2016/0097459 A1 | 4/2016 | Veliz et al. |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0258433 A1 | 9/2016 | Belshan et al. |
| 2016/0319626 A1 | 11/2016 | Dille |
| 2016/0319805 A1 | 11/2016 | Dille |
| 2016/0327165 A1 | 11/2016 | Sundararajan |
| 2017/0051738 A1 | 2/2017 | Horning |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0102101 A1 | 4/2017 | Duval-Arnould |
| 2017/0122055 A1 | 5/2017 | Embury |
| 2017/0159655 A1 | 6/2017 | Morreale |
| 2017/0175799 A1 | 6/2017 | Arnold |
| 2017/0204852 A1 | 7/2017 | Barnett, Jr. |
| 2017/0211708 A1 | 7/2017 | Kim |
| 2017/0218951 A1 | 8/2017 | Graham |
| 2017/0218993 A1 | 8/2017 | Freed |
| 2017/0268674 A1 | 9/2017 | Barbera et al. |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0045318 A1 | 2/2018 | Tanida |
| 2018/0058431 A1 | 3/2018 | Blume |
| 2018/0073653 A1 | 3/2018 | Bayyouk |
| 2018/0073654 A1 | 3/2018 | Nowell et al. |
| 2018/0202434 A1 | 7/2018 | Barnhouse, Jr. |
| 2018/0238459 A1 | 8/2018 | Nowell et al. |
| 2018/0258721 A1 | 9/2018 | Pawar et al. |
| 2018/0298481 A1 | 10/2018 | Kleyman et al. |
| 2018/0298894 A1 | 10/2018 | Wagner |
| 2018/0312946 A1 | 11/2018 | Gigliotti, Jr. |
| 2018/0320258 A1 | 11/2018 | Stewart |
| 2018/0340245 A1 | 11/2018 | Kernion |
| 2018/0354081 A1 | 12/2018 | Kalyani |
| 2018/0363642 A1 | 12/2018 | Salih et al. |
| 2019/0011051 A1 | 1/2019 | Yeung |
| 2019/0017503 A1 | 1/2019 | Foster |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0040966 A1 | 2/2019 | Myers et al. |
| 2019/0047049 A1 | 2/2019 | Fujieda |
| 2019/0049052 A1 | 2/2019 | Shuck |
| 2019/0063427 A1 | 2/2019 | Nowell |
| 2019/0063430 A1 | 2/2019 | Byrne |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0226476 A1 | 7/2019 | Stark et al. |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0331245 A1 | 10/2019 | Gable et al. |
| 2019/0360483 A1 | 11/2019 | Nowell |
| 2019/0368614 A1 | 12/2019 | Hurst |
| 2019/0368619 A1 | 12/2019 | Barnett et al. |
| 2019/0376508 A1 | 12/2019 | Wagner |
| 2020/0023245 A1 | 1/2020 | Story et al. |
| 2020/0056272 A1 | 2/2020 | Hong |
| 2020/0063899 A1 | 2/2020 | Witkowkski |
| 2020/0070034 A1 | 3/2020 | Sukup et al. |
| 2020/0072369 A1 | 3/2020 | Singley et al. |
| 2020/0080660 A1 | 3/2020 | Dyer |
| 2020/0080661 A1 | 3/2020 | Mullins |
| 2020/0132195 A1 | 4/2020 | Coombs |
| 2020/0157663 A1 | 5/2020 | Yang |
| 2020/0158123 A1 | 5/2020 | Chen |
| 2020/0173317 A1 | 6/2020 | Keating |
| 2020/0208776 A1 | 7/2020 | Bayyouk |
| 2020/0217424 A1 | 7/2020 | Rasmussen |
| 2020/0232455 A1 | 7/2020 | Blume |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0300367 A1 | 9/2020 | Caglio et al. |
| 2020/0308683 A1 | 10/2020 | Xue |
| 2020/0340314 A1 | 10/2020 | Yeldell et al. |
| 2020/0347843 A1 | 11/2020 | Mullins |
| 2020/0355182 A1 | 11/2020 | DeLeon |
| 2020/0362970 A1 | 11/2020 | Hurst |
| 2020/0362975 A1 | 11/2020 | Hurst et al. |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |

(56)          References Cited

U.S. PATENT DOCUMENTS

| 2021/0017983 A1 | 1/2021 | Myers |
| 2021/0025497 A1 | 1/2021 | Tsuji |
| 2021/0040836 A1 | 2/2021 | Baskin |
| 2021/0054486 A1 | 2/2021 | Kim |
| 2021/0062944 A1 | 3/2021 | Lee |
| 2021/0102630 A1 | 4/2021 | Nowell |
| 2021/0108734 A1 | 4/2021 | Nowell |
| 2021/0130936 A1 | 5/2021 | Wu |
| 2021/0146397 A1 | 5/2021 | Mittag et al. |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0222690 A1 | 7/2021 | Beisel |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0056906 A1 | 2/2022 | Lawson et al. |
| 2022/0065063 A1 | 3/2022 | Xu et al. |
| 2022/0145934 A1 | 5/2022 | Prevost et al. |
| 2022/0163031 A1 | 5/2022 | Chase |
| 2022/0163032 A1 | 5/2022 | Chase |
| 2022/0163118 A1 | 5/2022 | Maffezzoli et al. |
| 2022/0186718 A1 | 6/2022 | Peer |
| 2022/0205470 A1 | 6/2022 | Asthana et al. |
| 2022/0243723 A1 | 8/2022 | Herold et al. |
| 2022/0282719 A1 | 9/2022 | Barnhouse |
| 2022/0320790 A1 | 10/2022 | Demaratos |
| 2022/0333707 A1 | 10/2022 | Ting et al. |
| 2022/0349472 A1 | 11/2022 | Ellisor |
| 2022/0390055 A1 | 12/2022 | Ellisor |
| 2022/0403839 A1 | 12/2022 | Mullins |
| 2023/0041201 A1 | 2/2023 | Myers et al. |
| 2023/0129538 A1 | 4/2023 | Miller et al. |
| 2023/0130824 A1 | 4/2023 | Belshan et al. |
| 2023/0138338 A1 | 5/2023 | Barnhouse et al. |
| 2023/0184241 A1 | 6/2023 | Avey et al. |
| 2023/0220840 A1 | 7/2023 | Avey et al. |
| 2023/0258175 A1 | 8/2023 | Figgs et al. |
| 2023/0279991 A1 | 9/2023 | Avey et al. |
| 2023/0313890 A1 | 10/2023 | Foster et al. |
| 2023/0332596 A1 | 10/2023 | Chase |
| 2023/0383743 A1 | 11/2023 | Brock et al. |
| 2023/0383859 A1 | 11/2023 | Wiegand et al. |
| 2023/0399961 A1 | 12/2023 | Nogami |
| 2023/0407864 A1 | 12/2023 | Alex et al. |
| 2024/0042627 A1 | 2/2024 | Wang et al. |
| 2024/0102460 A1 | 3/2024 | Kachovskiy et al. |
| 2024/0117882 A1 | 4/2024 | Ellisor |
| 2024/0133277 A1 | 4/2024 | Brown et al. |
| 2024/0200656 A1 | 6/2024 | Avey |
| 2024/0200666 A1 | 6/2024 | Leake |
| 2024/0209945 A1 | 6/2024 | Prate et al. |
| 2024/0262067 A1 | 8/2024 | Iversen et al. |
| 2024/0309724 A1 | 9/2024 | Miller et al. |
| 2024/0369139 A1 | 11/2024 | Ellisor |
| 2024/0369141 A1 | 11/2024 | Patel et al. |
| 2024/0376892 A1 | 11/2024 | Ellisor |
| 2024/0376984 A1 | 11/2024 | Ellisor |
| 2024/0384795 A1 | 11/2024 | Barnett et al. |
| 2024/0418164 A1 | 12/2024 | Peer |
| 2024/0418282 A1 | 12/2024 | Featherstone et al. |
| 2025/0027486 A1 | 1/2025 | Alex et al. |
| 2025/0052325 A1 | 2/2025 | Berryhill |
| 2025/0075818 A1 | 3/2025 | Xu |
| 2025/0207574 A1 | 6/2025 | Foster et al. |
| 2025/0237308 A1 | 7/2025 | Ellisor |
| 2025/0251044 A1 | 8/2025 | Berryhill |
| 2025/0257798 A1 | 8/2025 | Zitting |
| 2025/0277487 A1 | 9/2025 | Ellisor et al. |
| 2025/0283463 A1 | 9/2025 | Mullins et al. |
| 2025/0283464 A1 | 9/2025 | Ellisor et al. |
| 2025/0320866 A1 | 10/2025 | Barnett et al. |
| 2026/0002531 A1 | 1/2026 | Peer et al. |
| 2026/0043491 A1 | 2/2026 | Xu et al. |
| 2026/0078474 A1 | 3/2026 | Verma et al. |
| 2026/0078754 A1 | 3/2026 | Verma et al. |
| 2026/0126115 A1 | 5/2026 | Ellisor et al. |
| 2026/0132850 A1 | 5/2026 | Peer et al. |

FOREIGN PATENT DOCUMENTS

| CN | 2637843 Y | 9/2004 |
| CN | 200971972 Y | 11/2007 |
| CN | 101169190 A | 4/2008 |
| CN | 201149099 | 11/2008 |
| CN | 201401518 Y | 2/2010 |
| CN | 201412533 Y | 2/2010 |
| CN | 201610950 U | 10/2010 |
| CN | 201621317 U | 11/2010 |
| CN | 201687978 U | 12/2010 |
| CN | 201705964 U | 1/2011 |
| CN | 201705982 U | 1/2011 |
| CN | 102212776 A | 10/2011 |
| CN | 202182204 U | 4/2012 |
| CN | 102537510 A | 7/2012 |
| CN | 102748483 | 10/2012 |
| CN | 202545162 U | 11/2012 |
| CN | 102828141 A | 12/2012 |
| CN | 202790585 U | 3/2013 |
| CN | 202852048 U | 4/2013 |
| CN | 202884071 U | 4/2013 |
| CN | 202914795 U | 5/2013 |
| CN | 103147718 A | 6/2013 |
| CN | 203098370 U | 7/2013 |
| CN | 203257342 U | 10/2013 |
| CN | 203604686 U | 5/2014 |
| CN | 204040978 U | 12/2014 |
| CN | 104329464 A | 2/2015 |
| CN | 104455529 A | 3/2015 |
| CN | 104550926 A | 4/2015 |
| CN | 204253915 U | 4/2015 |
| CN | 204738957 U | 11/2015 |
| CN | 204805591 U | 11/2015 |
| CN | 205136660 U | 4/2016 |
| CN | 205315253 U | 6/2016 |
| CN | 106151558 A | 11/2016 |
| CN | 205841808 U | 12/2016 |
| CN | 106481831 A | 3/2017 |
| CN | 206386512 U | 8/2017 |
| CN | 206530720 U | 9/2017 |
| CN | 206845939 U | 1/2018 |
| CN | 107795698 A | 3/2018 |
| CN | 108329035 A | 7/2018 |
| CN | 208364190 U | 1/2019 |
| CN | 208416485 U | 1/2019 |
| CN | 208416492 U | 1/2019 |
| CN | 109321864 A | 2/2019 |
| CN | 109458326 A | 3/2019 |
| CN | 109695727 A | 4/2019 |
| CN | 209261799 U | 8/2019 |
| CN | 209370028 U | 9/2019 |
| CN | 110374522 A | 10/2019 |
| CN | 209469613 U | 10/2019 |
| CN | 110454586 A | 11/2019 |
| CN | 209725279 U | 12/2019 |
| CN | 209866424 U | 12/2019 |
| CN | 111005695 A | 4/2020 |
| CN | 111073186 A | 4/2020 |
| CN | 111455306 A | 7/2020 |
| CN | 111664087 A | 9/2020 |
| CN | 111690923 A | 9/2020 |

(56) References Cited

FOREIGN PATENT DOCUMENTS

| | | | |
|---|---|---|---|
| CN | 211649111 U | 10/2020 | |
| CN | 212080181 U | 12/2020 | |
| CN | 212249951 U | 12/2020 | |
| CN | 212718129 U | 3/2021 | |
| CN | 102410194 | 4/2021 | |
| CN | 213236168 U | 5/2021 | |
| CN | 113634953 A | 11/2021 | |
| CN | 215172271 U | 12/2021 | |
| CN | 114196903 A | 3/2022 | |
| CN | 218523056 U | 2/2023 | |
| CN | 220082168 U | 11/2023 | |
| CN | 220320353 U | 1/2024 | |
| CN | 223434777 U | 10/2025 | |
| CN | 223459920 U | 10/2025 | |
| DE | 3126421 | 1/1983 | |
| DE | 112008000977 T5 | 2/2010 | |
| DE | 102009001560 A1 | 9/2010 | |
| DE | 202012104058 U1 | 3/2014 | |
| DE | 102019123225 A1 | 3/2020 | |
| EP | 0 414 955 | 3/1991 | |
| EP | 0520567 A1 | 12/1992 | |
| EP | 3336356 A1 | 6/2018 | |
| EP | 3696408 A1 | 8/2020 | |
| GB | 387341 A | 1/1933 | |
| GB | 2123100 | 1/1986 | |
| GB | 2240592 | 8/1991 | |
| IN | 79MA2001 A | 9/2007 | |
| JP | H08291376 A | 11/1996 | |
| JP | 4019476 B2 | 12/2007 | |
| JP | 2021025560 A | 2/2021 | |
| WO | 2015/077001 | 5/2015 | |
| WO | 2016/024939 | 2/2016 | |
| WO | 2016/045768 | 3/2016 | |
| WO | 2019/169312 | 9/2019 | |
| WO | 2020/180716 | 9/2020 | |
| WO | 2021195572 | 9/2021 | |
| WO | 2022167341 A1 | 8/2022 | |
| WO | 2024026432 | 2/2024 | |
| WO | 2024076786 A1 | 4/2024 | |
| WO | 2024/119019 | 6/2024 | |

OTHER PUBLICATIONS

U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 2 pages, 2021.
Cutting Tool Engineering, "Groove milling," Aug. 1, 2012, https://www.ctemag.cojm/news/articles/groove-milling, accessed May 13, 2020, 11 pages.
VargusUSA, "Groovex Innovative Grooving Solutions—Groove Milling," Dec. 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages, 2008.
Kerr Pumps, Kerr KD-1250B/KD-1250BCB Plunger Pump Service Manual, 38 pages, 2017.
Kerr Pumps, Kerr KJ-2250B and KJ-2250BCB Plunger Pump Service Manual, 38 pages, 2008.
Kerr Pumps, Kerr KM-3250B / KM-3250BCB Plunger Pump Service Manual, 35 pages, 2008.
Kerr Pumps, Kerr KP-3300B / KP-3300BCB Plunger Pump Service Manual, 41 pages, 2008.
Kerr Pumps, Kerr KT-3350B/BCB KT-3400BCB Plunger Pump Service Manual, 46 pages, 2008.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings, LLC Docket Entries*, https://law.lexmachina.com/cases/2004206451#docket-entries, 6 pages, 2020.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 pages, 2016.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages, 2013.
Gardner Denver Pumps, Redline Series Brochure, 3 pages, 2021.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.

(56) References Cited

OTHER PUBLICATIONS

Utex Industries, Inc., Well Service Packing—Packing Assemblies Complete & Replacement, May 2013, 40 pages.

Vargus Ltd., Groove Milling High Precision Tools for Groove Milling, Dec. 2012, pp. 2-22.

Vulcan, High-Impact Replacement Parts, Fortified Valves and Seats, found at: https://www.vulcanindustrial.com/energy-products/replacement-parts, 2021.

DiaCom Corporation, "Diaphragm Design Guidebook", 28 pages, 2018.

Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.

Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.

White Star Pump Co., "Maintenance Manual: Triplex Pump WS-1300/1600," 2005, http://www.whitestarpump.com/ES/docs/user_t.pdf, 45 pages.

KerrPumps, "Super Stainless Steel Better Than The Best," http://kerrpumps.com/superstainless?gclid=EAlalQobChMIg470482q6wlVilTICh2XPA-qEAAYASAAEgKrxPD_BWE, 2013, last accessed: Aug. 21, 2020, 6 pages.

KerrPumps, "Frac One Pumps—Fluid End—Fracing," http://kerrpumps.com/fracone, 2013, last accessed: Aug. 21, 2020, 3 pages.

KerrPumps, "KerrPumps—Frac Pump & Mud Pump Fluid End—Fluid End Pump," http://kerrpumps.com/fluidends, 2013, last accessed: Aug. 21, 2020, 6 pages.

Vulcan Industrial, "Vulcan," http://www.vulcanindustrial.com/, 2019, last accessed: Aug. 21, 2020, 3 pages.

Vulcan Industrial, "Vulcan," http://www.vulcanindustrial.com/fluid-ends/, 2019, last accessed: Aug. 21, 2020, 3 pages.

Covert Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).

Kerr Pumps, "the most advanced fluid ends", (site visited Aug. 5, 2021), Kerrpumps.com, URL: <http://kerrpumps.com/fluidends> (Year: 2021).

Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).

John Miller, "The Reciprocating Pump, Theory, Design and Use," 1995, 2nd Edition, Krieger Publishing Company, Malabar, Florida, 1 page.

"QIH-1000 HP Quintuplex," Dixie Iron Works, 2017, https://web.archive.org/web/20171031221150/http:/www.diwmsi.com/pumping/qi-1000/.

Technical Manual MSI Hybrid Well Service Pump Triplex and Quintuplex Models, Dixie Iron Works, Mar. 12, 2019, 88 pages. https://www.diwmsi.com/pumping/qi-1000/, 2000.

Carpenter, "CarTech Ferrium C61 Data Sheet," 2015, 2 pages.

The American Heritage Dictionary, Second College Edition, 1982, 6 pages.

Matthew Bultman, "Judge in West Texas Patent Hot Spot Issues Revised Guidelines," Sep. 23, 2020, Bloomberg Law News, 3 pages.

David L. Taylor, "Machine Trades Blueprint Reading: Second Edition," 2005, 3 pages.

Blume, U.S. Pat. No. 6,544,012, issued Apr. 8, 2003, Fig. 12A.

Caterpillar, "Cat Fluid Ends For Well Stimulation Pumps," 2015, 2 pages.

Claim Chart for U.S. Pat. No. 6,544,012, 23 pages.

Claim Chart for U.S. Pat. No. 7,186,097, 22 pages.

Claim Chart for U.S. Pat. No. 7,845,413, 8 pages.

Claim Chart for U.S. Pat. No. 9,534,472, 8 pages.

Claim Chart for U.S. Pat. Pub. No. 2013/0319220, 17 pages.

Claim Chart for U.S. Pat. Pub. No. 2014/0348677, 10 pages.

Claim Chart for U.S. Pat. Pub. No. 2015/0132157, 23 pages.

Claim Chart for "GD-3000," 9 pages.

Claim Chart for "NOV-267Q," 14 pages.

Collins English Dictionary, "annular," https://www.collinsdictionary.com/us/dictionary/english/annular, 2021, 4 pages.

Collins English Dictionary, "circumference," https://www.collinsdictionary.com/us/dictionary/english/circumference, 2021, 7 pages.

Collins English Dictionary, "plug," https://www.collinsdictionary.com/us/dictionary/english/plug, 2021, 17 pages.

Collins English Dictionary, "profile," https://www.collinsdictionary.com/us/dictionary/english/profile, 2021, 10 pages.

Collins English Dictionary, "sleeve," "therethrough," "through," "tube," and "tubular," 8 pages, 2017.

Collins English Dictionary, "space," https://www.collinsdictionary.com/us/dictionary/english/space, 2021, 13 pages.

Collins English Dictionary, "stairstep," https://www.collinsdictionary.com/us/dictionary/english/stairstep, 2021, 3 pages.

Congressional Record—Extensions of Remarks, Apr. 18, 2007, pp. E773-E775.

Congressional Record, Mar. 7, 2011, 31 pages.

"Declaration of Steven M. Tipton, Ph.D., P.E., Submitted with Patent Owner's Preliminary Response," Sep. 11, 2020, 155 pages.

"Declaration of William D. Marscher, P.E.—U.S. Pat. No. 10,914,171," Feb. 11, 2021, 308 pages.

"Declaration of William D. Marscher, P.E.—U.S. Pat. No. 10,591,070," May 25, 2020, 209 pages.

Email dated Sep. 22, 2020 in PGR2020-00065, 3 pages.

Email dated Sep. 25, 2020 in *Kerr Machine* v *Vulcan Industrial Holdings*, 1 page.

U.S. Pat. No. 10,288,178, 353 pages.

U.S. Pat. No. 10,519,950, 142 pages.

U.S. Pat. No. 10,591,070, 168 pages.

U.S. Appl. No. 16/722,139, 104 pages.

U.S. Appl. No. 13/773,271, 250 pages.

U.S. Appl. No. 15/719,124, 183 pages.

International Search Report and Written Opinion for international application No. PCT/US2025/059804, mailed Mar. 11, 2026.

Declaration of Duncan Hall from Internet Archive/Wayback Machine, Feb. 3, 2021, Kerr Plunger Pump Manuals, 20 pages.

Michael Agnes, Editor, Webster's New World College Dictionary, Fourth Edition, 1999, 5 pages.

WEIR SPM Oil & Gas, Grooveless Fluid End, 2008, 1 page.

WEIR SPM Oil & Gas, Weir SPM General Catalog, 2009, 40 pages.

WEIR SPM Oil & Gas, Well Service Pump Reference Guide, 2008, 55 pages.

*Intellectual Ventures I LLC* v *VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.

*Vulcan Industrial Holding, LLC et al. v. Kerr Machine Co.* Case No. 4:21-cv-433, Document 1, Complaint for Declaratory Judgment of Patent Non-Infringement, Feb. 9, 2021, 17 pages.

*Trilogy Enterprises, Inc., v. Trilogy Education Services, LLC*, Case. No. 6: 19-cv-199-ADA-JCM, Document 35, Fifth Amended Scheduling Order, Sep. 8, 2020, 4 pages.

*Dr. Corneliu Bolbocean* v *Baylor University*, Case No. 6:19-CV-00465-ADA-JCM, Document 34, Scheduling Order, Apr. 6, 2020, 4 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.

(56) References Cited

OTHER PUBLICATIONS

*Kerr Machine Co.,* v *Vulcan Energy Services, LLC, Vulcan Industrial Holdings, LLC, and Cizion, LLC d/b/a/ Vulcan Industrial Manufacturing,* Case No. 6:21-CV-00044-ADA, Document 10, Plaintiff's Second Amended Complaint for Patent Infringement and Jury Demand, Feb. 1, 2021, 88 pages.

*Kerr Machine Co.,* v *Vulcan Industrial Holdings, LLC, Vulcan Energy Services, LLC, Cizion, LLC,* Case No. W-20-CV-00200-ADA-24, Order Setting Trial Date, Jun. 14, 2020, 1 page.

*Kerr Machine Co.,* v *Vulcan Industrial Holdings, LLC, Vulcan Energy Services, LLC, Cizion, LLC,* Case No. W-20-CV-00200-ADA-29, Order Setting Trial Date, Aug. 2, 2020, 1 page.

*Kerr Machine Co.,* v. *Vulcan Industrial Holdings, LLC,* Case. No. 6:20-CV-00200-ADA, Affidavit of Service, Apr. 7, 2020, 1 page.

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Plaintiff's First Amended Complaint for Patent Infringement and Jury Demand, Jun. 4, 2020, 11 pages.

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.

*Kerr Machine Co.,* v *Vulcan Industrial Holdings, LLC,* Case No. 6:20-CV-00200-ADA, Plaintiff's Preliminary Infringement Contentions, May 22, 2020, 50 pages.

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Defendants' Preliminary Invalidity Contentions, Aug. 13, 2020, 29 pages.

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Document 34, Scheduling Order, Aug. 11, 2020, 3 pages.

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Document 38, Plaintiff's Second Amended Complaint for Patent Infringement and Jury Demand, Sep. 25, 2020, 11 pages.

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Document 5, Standing Order regarding Scheduled Hearings in Civil Cases in Light of Chief Judge Garcia's 24 Amended Order, Mar. 24, 2020, 4 pages.

*Kerr Machine Co.,* v *Vulcan Industrial Holdings, LLC, Vulcan Energy Services, LLC, and Cizion, LLC d/b/a/ Vulcan Industrial Manufacturing,* Civil Docket for Case No. 6:20-cv-00200-ADA, accessed Sep. 11, 2020, 7 pages.

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Document 54, Claim Construction Order, Dec. 3, 2020, 3 pages.

*Kerr Machine Co.,* v *Vulcan Industrial Holdings, LLC, Vulcan Energy Services, LLC, and Cizion, LLC d/b/a/ Vulcan Industrial Manufacturing,* Case No. 6:20-CV-00200-ADA, Docket Entry, Aug. 2, 2020, 1 page.

*Kerr Machine Co.,* v *Vulcan Industrial Holdings, LLC,* Case No. 6:20-CV-00200, Document 1, Plaintiff's Original Complaint for Patent Infringement and Jury Demand, Mar. 19, 2020, 39 pages.

*Adriana del Rocio Barberena-Rovira, et al.,* v *Kuiper Dairy, LLC, et al.,* Case No. 6:20-CV-00250-ADA-JCM, Document 20, Scheduling Order, Jul. 22, 2020, 4 pages.

*Acquanlan Deonshay Harris* v. *Cenlar, FSB,* Case No. 6:20-CV-00271-ADA-JCM, Document 13, Scheduling Order, Aug. 20, 2020, 4 pages.

Senior Living Properties, LLC c. Ironshore Speciality, Insurance Company, Case No. 6:20-CV-00282-ADA-JCM, Document 12, Scheduling Order, Jul. 7, 2020, 4 pages.

*Dionne Bracken, Individually and as Next Friend of A.M.B.,* v *Michael D. Ashcraft and Envirovac Waste Transport Systems, Inc.,* Case No. 6:20-CV-00308-ADA-JCM, Document 17, Scheduling Order, Jul. 28, 2020, 4 pages.

*Kendra Coufal* v. *Roger Lee Thomas and Apple Logistics, Inc.,* Case No. 6:20-CV-00356-ADA-JCM, Document 12, Scheduling Order, Jul. 28, 2020, 4 pages.

*Tipton International, Inc.,* v. *Vetbizcorp, LLC and Samuel Cody,* Case No. 6:20-CV-00554-ADA-JCM, Document 8, Scheduling Order, Aug. 20, 2020, 4 pages.

*Dynaenergetics GmbH & Co. KG and Dynaenergetics US, Inc.,* v. *Hunting Titan, Ltd.; Hunting Titan, Inc.; and Hunting Energy Services, Inc.,* Case No. H-17-3784, Order, Sep. 4, 2020, 2 pages.

Slip Opinion, In re Sand Revolution LLC, Case No. 2020-00145 (Fed. Cir. Sep. 28, 2020), 3 pages.

In re Vulcan Industrial Holdings, LLC, Case No. 2020-00151 (Fed. Cir. Sep. 29, 2020), Petition for Writ of Mandamus, 43 pages.

*Densys Ltd.,* v. *3Shape Trios A/S and 3Shape A/S,* Case No. WA:19-CV-00680-ADA, Document 27, Scheduling Order, Apr. 8, 2020, 4 pages.

*Kerr Machine Co.* vs. *Vulcan Industrial Holdings, LLC,* Case No. WA:20-CV-00200-ADA, Order Setting Markman Hearing, May 29, 2020, 1 page.

Sur-Lock Liner Retention System—Product Brochure (p. 16) (Year: 2017).

Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).

U.S. Appl. No. 17/241,680 titled "Fluid End and Center Feed Suction Manifold" filed Apr. 27, 2021.

Karolczuk et al., "Application of the Gaussian Process for Fatigue Life Prediction Under Multiaxial Loading", Mechanical Systems and Signal Processing 167 (2022), Nov. 14, 2021.

Carraro et al. "A Damage Based Model for Crack Initiation in Unidirectional Composites Under Multiaxial Cyclic Loading", Composite Science and Technology 99 (2014), 154-163, May 16, 2014.

Albinmousa et al., "Cyclic Axial and Cyclic Torsional Behaviour of Extruded AZ31B Magnesium Alloy", International Journal of Fatigue 33 (2011), 1403-1416, 2011.

Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.

Guan et al., "Model Selection, Updating, and Averaging for Probabilistic Fatigue Damage Prognosis", Journal of Structural Safety, Mar. 11, 2011.

Frick et al., "Orientation-Independent Pseudoelasticity in Small-Scale NITI Compression Pillars", Scripta Materialia 59(12), 7-10, 2008.

Naghipour et al., "Fatigue Analysis of Notched Laminates: A Time-Efficient Macro-Mechanical Approach", Ohio Aerospace Institute, Cleveland, 2016.

International Search Report and Written Opinion for international application No. PCT/US2023/066143, mailed Aug. 28, 2023.

International Search Report and Written Opinion for international application No. PCT/US2023/073458, mailed Feb. 1, 2024.

400

402

404

SYSTEM AND METHOD FOR VALVE ASSEMBLY

CROSS REFERENCE TO RELATED APPLICATIONS

This application is a continuation of U.S. Non-Provisional application Ser. No. 17/678,136, filed Feb. 23, 2022, titled "SYSTEM AND METHOD FOR VALVE ASSEMBLY," now U.S. Pat. No. 12,292,120, issued May 6, 2025, which claims the benefit of U.S. Provisional Patent Application No. 63/152,501, filed Feb. 23, 2021, titled "SYSTEM AND METHOD FOR VALVE ASSEMBLY," the full disclosures of which are hereby incorporated herein in their entireties by reference.

TECHNICAL FIELD

Embodiments of the subject matter disclosed herein generally relate to pump systems, and in particular to valves in pump systems.

BACKGROUND

Pumping systems may be used in a variety of applications, especially industrial applications where pumping systems are used to elevate a working fluid pressure. One such application is hydraulic fracturing systems, where high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A valve assembly includes valve members that reciprocate and contact valve seats at the inlet and outlet passages. Due to the particulates and corrosive nature of the working fluid, the valve seats and/or portions of the valve member may become eroded or otherwise damaged, which my prevent sealing of the inlet and outlet passages.

SUMMARY

Applicant recognized the problems noted above herein and conceived and developed embodiments of systems and methods, according to the present disclosure, for valve assemblies.

In an embodiment, a valve member includes an upper portion, guide legs, and a sealing element. The upper portion includes a top side, an underside, an annular recess positioned between the top side and the underside, and a cavity extending at least partially into a body of the upper body, the cavity arranged at the underside. The guide legs include a plurality of legs and a coupling member extending axially from the plurality of legs. The sealing element is configured to be installed within the annular recess. The upper portion is coupled to both the guide legs and the sealing element via a single force application process to axially position the sealing element within the annular recess and to position the coupling member into the cavity.

In an embodiment, a valve member includes an upper portion, guide legs, and a sealing element. The upper portion includes a top side, an underside, an annular recess positioned between the top side and the underside, and a cavity extending at least partially into a body of the upper body, the cavity arranged at the underside. The guide legs include a plurality of legs and a coupling member extending axially from the plurality of legs. The sealing element is configured to be installed within the annular recess. The upper portion is coupled to at least one of the guide legs or the sealing element via a single force application process.

In another embodiment, a method for forming a valve member includes positioning guide legs within a fixture. The method also includes positioning, axially away from the guide legs, a sealing element. The method further includes positioning, axially higher than the sealing element, a carrier portion. The method also includes applying a linear force to drive each of the guide legs, the sealing element, and the carrier portion into a mating relationship.

In an embodiment, a valve assembly includes an upper portion to be coupled to guide legs, a cavity being formed within one of the upper portion or the guide legs and a coupling member being associated with the other of the upper portion or the guide legs, wherein the upper portion is coupled to the guide legs via a single force application process.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
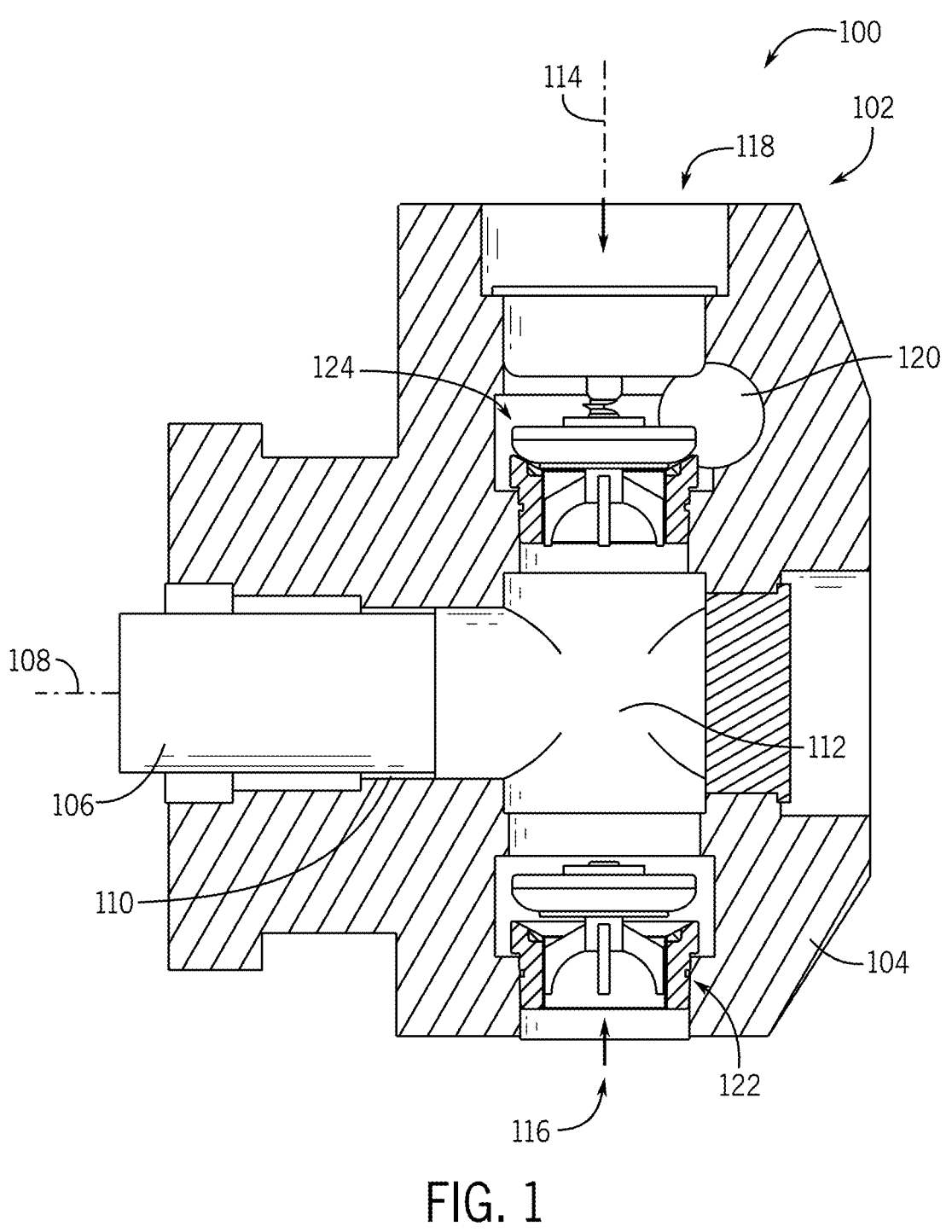
FIG. 1 is a schematic cross-sectional view of an embodiment of a pump assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed toward systems and methods for forming components of a valve assembly. In various embodiments, the systems and methods described herein are directed toward a valve traditionally formed from a metal body with an elastomer sealing element and introduces a metal body with at least two pieces where the sealing element and the guide legs may be made from separate materials and/or using separate methods and then assembled together during the process of installing the non-metallic sealing element.

In various embodiments, a method may be directed toward placing the guide legs into a fixture, placing the non-metallic sealing element into the same fixture axially distanced from the guide legs, placing the metal sealing element/non-metallic seal carrier into the top of the fixture, and applying a linear force driving the three components together in a single operation.

In various embodiments, a method may be directed toward placing the guide legs into a fixture, placing the metal sealing element/non-metallic seal carrier into the top of the fixture, applying a linear force driving the two components together, placing the non-metallic element into a fixture, placing the assembled seal carrier/guide legs into a fixture, and applying a linear force driving the non-metallic seal onto the resident seal carrying ring.

Various embodiments of the present disclosure are directed toward two or more unique pieces that are pressed together via a linear force to make up the seal carrying element and the guide legs. The guide legs can be made from metallic or composite elements. The entire assembly is then press fit together either in a single operation or two separate operations. Various embodiments are directed toward a first body piece having a cavity that receives at least a portion of the guide legs. The guide legs may be press fit into the cavity and maintained in position via an interference fit between the cavity and the guide legs. Furthermore, in one or more embodiments, the guide legs may include snaps or fingers that may be biased inwardly when inserted into the cavity and then extend radially outward to secure the fingers to a ledge or shelf formed in the cavity. Furthermore, in one or more embodiments, a snap ring, o-ring, or the like may be utilized with the cavity and/or guide legs.

In at least one embodiment, guide legs are secured to the seal carrier using one or more operations, such as a press fit, threads, external fasteners, or the like, and a seal element is press fit onto the seal carrier.

Traditional valves are formed using a two-piece metal body where the guide legs are threaded into a top element. The non-metallic seal element is molded onto the top element. Furthermore, other prior art valves may feature two different cast-in-place sealing materials for use with the valves and may further include retention features for the sealing element.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet chamber 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger 106, and is driven out of the pressure chamber 112 into the outlet chamber 118 and out an outlet passage 120, for example on a down stroke of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed position, while the spring force of the valve assembly 124 is overcome, thereby enabling the fluid to exit via the outlet passage 120.

Figure 2:
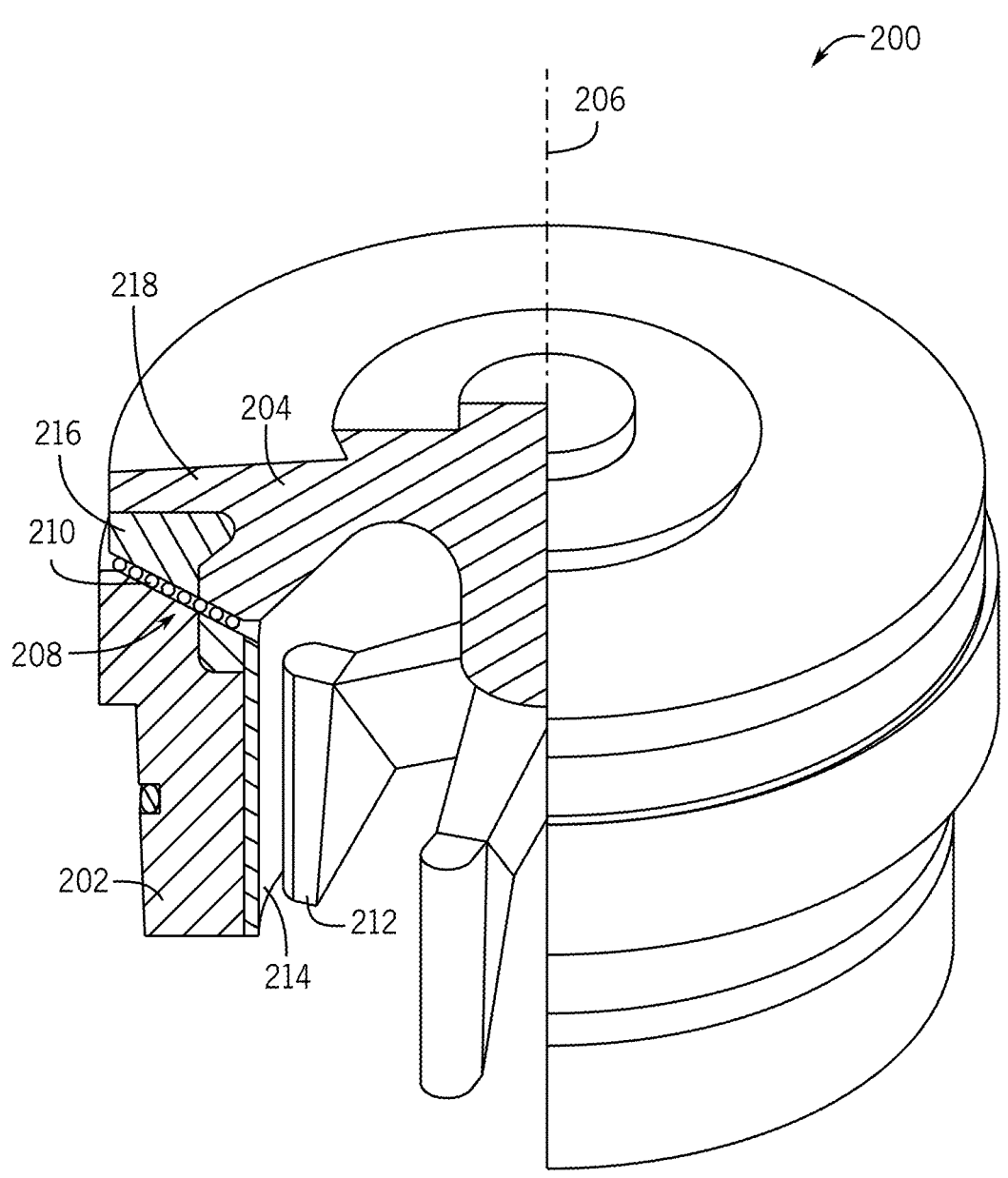
FIG. 2 is a schematic sectional view of an embodiment of a valve assembly, in accordance with embodiments of the present disclosure.

FIG. 2 is a schematic cut away view of an embodiment of a valve assembly 200, such as the valve assemblies 122, 124, which may be utilized with a pump assembly. The illustrated valve assembly 200 includes a valve seat 202 and a valve member 204. In operation, the valve member 204 reciprocates along a valve axis 206, which may correspond to the pressure chamber axis 114, such that the valve member 204 moves into and out of contact with the valve seat 202. In the illustrated embodiment, particulates 208 have accumulated along the valve seat 202, for example at a strike face 210 (e.g., contact face). Repeated contact from the valve member 204 may drive the particulates 208 into the strike face 210, causing scarring or other damage to one or both of the valve seal 216 and/or valve member 204. Additionally, corrosive fluids may contact other portions of the valve seat 202 and/or valve member 204, in addition to the strike face 210. Damage to the valve seat 202 and/or valve member 204 may cause the sealing capability of the valve assembly 200 to degrade, thereby reducing the effectiveness of the pump assembly.

In various embodiments, guide legs 212 of the valve member 204 may also lead to damage to various portions of the valve seat 202. For example, in the illustrated embodiment, the guide legs 212 extend along a bore 214 of the valve member 204. Due to the presence of the corrosive fluid and/or the particulates, damage may occur along the bore 214, such as scarring. Additionally, damage may also accumulate on the guide legs 212. As a result, the pump assembly may be taken out of service for repairs, which may be expensive and also contribute to non-productive time at the well site. Furthermore, various components of the valve assembly 200 are often replaced rather than repaired, thereby increasing costs for operators.

While various components of the valve seat 202 may be exposed to damage, similar damage may also occur to the valve member 204. For example, the valve member 204 may include a sealing element 216 (e.g., sealing assembly, seal assembly) arranged circumferentially about a body 218 (e.g., valve body). In various embodiments, the sealing element 216 is an elastomer, which may be susceptible to damage due to repeated contact with the particulates 208 and/or due to the force of striking the strike face 210. Damage to the valve member 204 may also reduce the sealing effectiveness of the valve assembly 200, thereby leading to replacement or repairs. During a typical fracturing operation, hundreds of valve members 204 may be replaced, which can lead to high costs for operators. Embodiments of the present disclosure may include systems and methods directed toward the valve member 204.

Figure 3A:
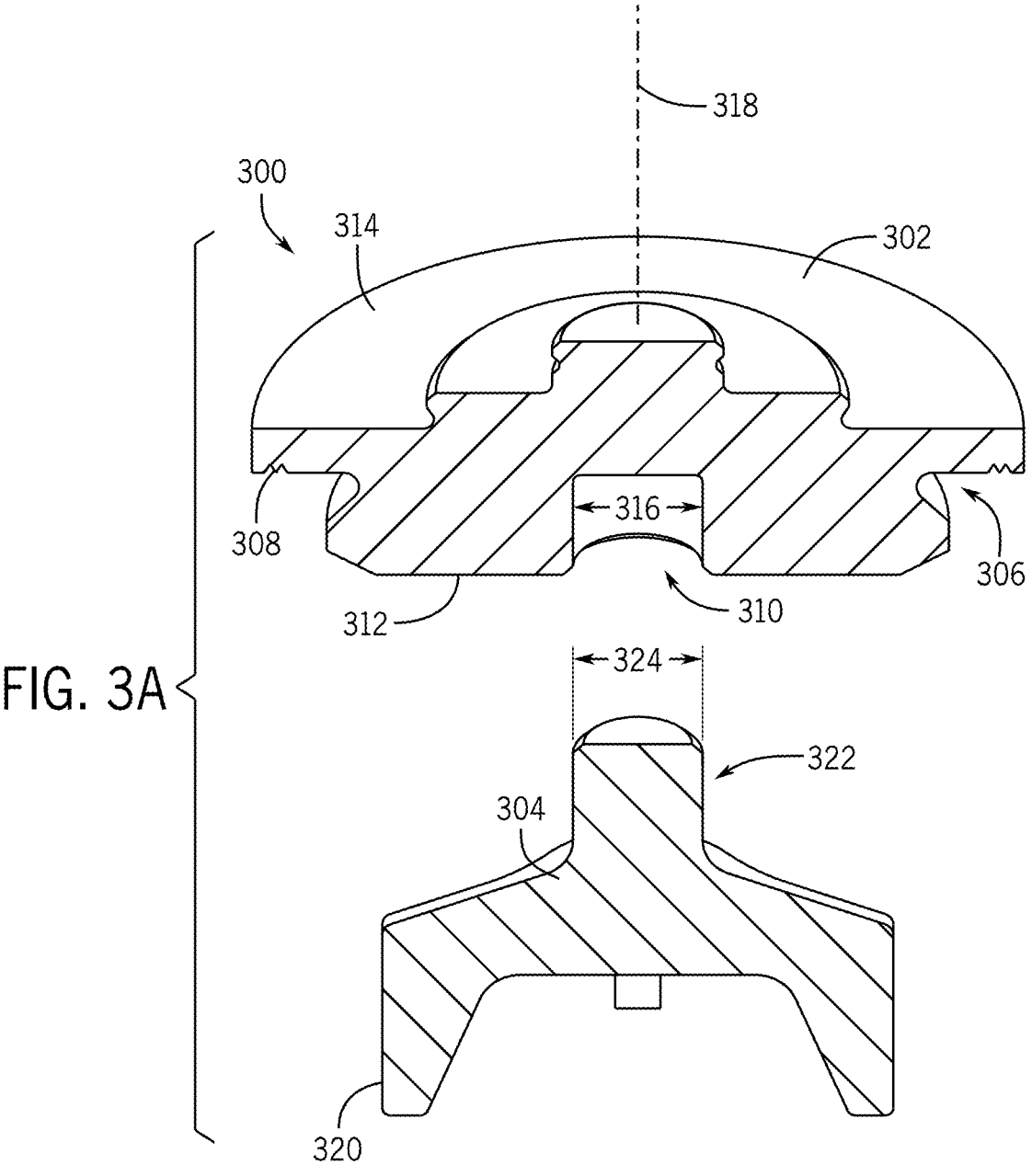
FIG. 3A is an exploded sectional view of an embodiment of a valve member, in accordance with embodiments of the present disclosure.

FIGS. 3A-3D illustrate a valve member 300 that may be formed using embodiments of the systems and methods disclosed herein. FIG. 3A is a sectional exploded view of an embodiment of the valve member 300 including an upper portion 302 (e.g., top portion, body, seal carrier, etc.) and guide legs 304 (e.g., guide leg assembly, legs, lower portion, etc.). In operation, the upper portion 302 will be joined to the guide legs 304 and utilized with a valve assembly. In this example, the upper portion 302 includes an annular recess 306 for receiving and supporting a seal element (not pictured) which may be a non-metallic seal element, such as an elastomer or the like. The recess 306 includes retention features 308 that may dig into or otherwise hold the seal element in place.

Further illustrated in FIG. 3A is a cavity 310 formed within an underside 312 (e.g., bottom side) of the upper portion 302. The cavity 310 in this example extends upwardly toward a top side 314 and includes is generally cylindrical with a cavity diameter 316. It should be appreciated that a cylindrical cavity is for illustrative purposes only and that the cavity may have a variety of different shapes and configurations. Furthermore, a single cavity is also for illustrative purposes and there may be multiple different cavities formed along the underside 312. The cavity 310 is further illustrated as being substantially centered along an axis 318 of the valve member 300, but this is for illustrative purposes only and the cavity 310 may be offset from the axis 318. Furthermore, while a single cavity 310 is shown in this illustrated embodiment, various embodiments may include multiple cavities 310 that may receive coupling elements from the guide legs 304.

The guide legs 304 are illustrated decoupled from the upper portion 302, for example prior to an assembly process, such as a process that will be described herein. In various embodiments, the guide legs 304 include three legs 320, but it should be appreciated that there may be more or fewer legs 320 and three is just shown as an example. The guide legs 304 further includes a coupling member 322 that is adapted to engage the upper portion 302, for example via installation within the cavity 310. As noted above, a number of coupling members 322 may conform to a number of cavities 310 of the upper portion 302. However, there may be more or fewer coupling members 322 and/or cavities 310. For example, different configurations may be used for different guide legs 304 such that the various configurations may be unique to reduce a likelihood an unintended set of guide legs 304 is coupled to the upper portion 302. As will be described below, it should be appreciated that an opposite configuration may also be considered where the cavity 310 is formed in the guide legs 304 and the coupling member 322 is formed on the upper portion 302. In this example, the coupling member 322 is substantially cylindrical to conform to the shape of the cavity 310. In various embodiments, a coupling member diameter 324 is sized to facilitate a press fit to couple the upper portion 302 to the coupling member 322. For example, the coupling member diameter 324 may be approximately the same size as the cavity diameter 316 and/or larger than the cavity diameter 316 such that the coupling member 322 remains positioned within the cavity 310 after installation.

In operation, the guide legs 304 may be joined to the coupling member 324 via a press fitting operation. By way of example, the guide legs 304 may be secured to a fixture along with a non-metallic sealing element. Thereafter, a metal sealing element and/or non-metallic seal carrier may be installed on the top of the fixture and a linear force may be applied to drive the three components together using a single operation. However, it should be appreciated that other methods may also be utilized join the components together. As an example, the guide legs 304 may be placed within a fixture along with the metal sealing element/non-metallic seal carrier at a top of the fixture. A linear force may be used to join the components together, and thereafter, the non-metallic element may be positioned within the fixture. The assembled components may then be positioned within the fixture and another linear force may drive the non-metallic seal onto the resident seal carrying ring.

Figure 3B:
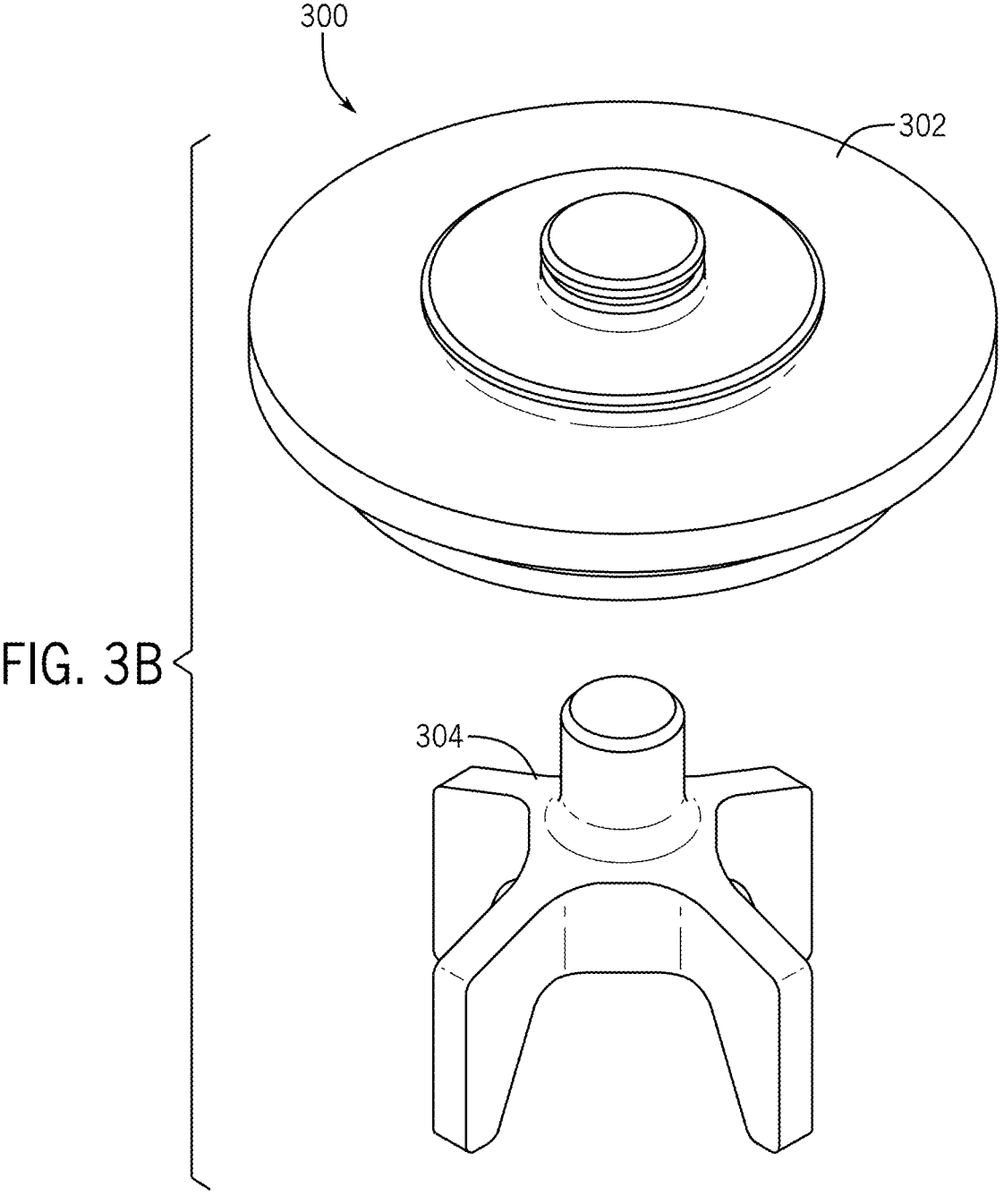
FIG. 3B is an exploded perspective view of an embodiment of a valve member, in accordance with embodiments of the present disclosure.
Figure 3C:
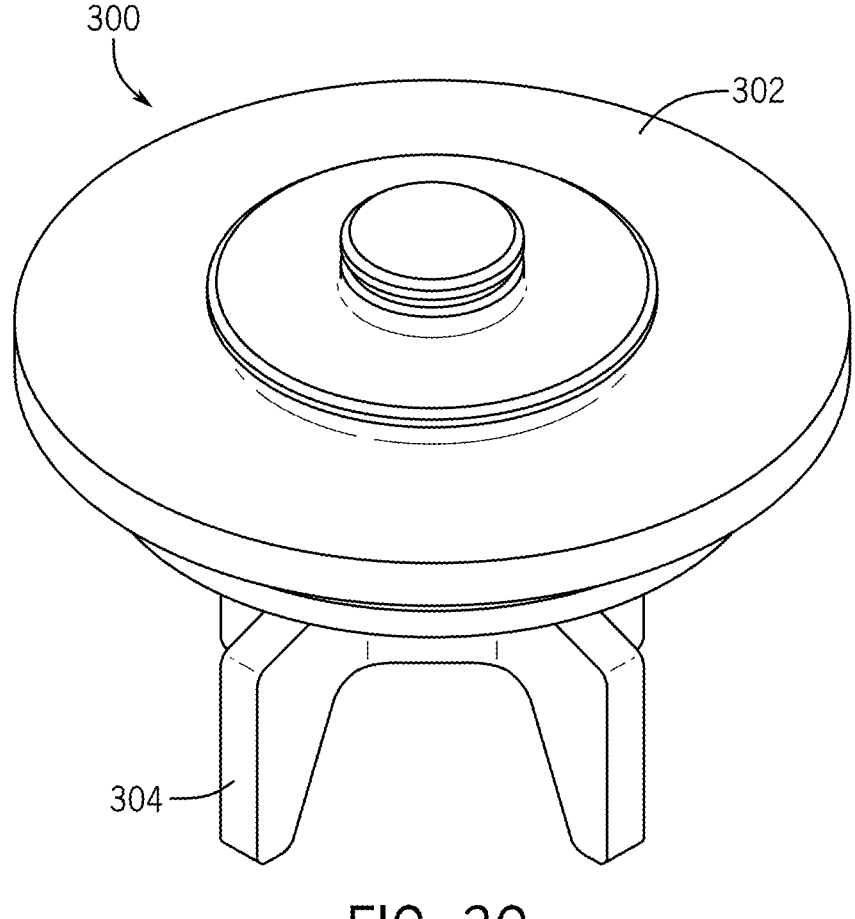
FIG. 3C is a top perspective view of an embodiment of a valve member, in accordance with embodiments of the present disclosure.
Figure 3D:
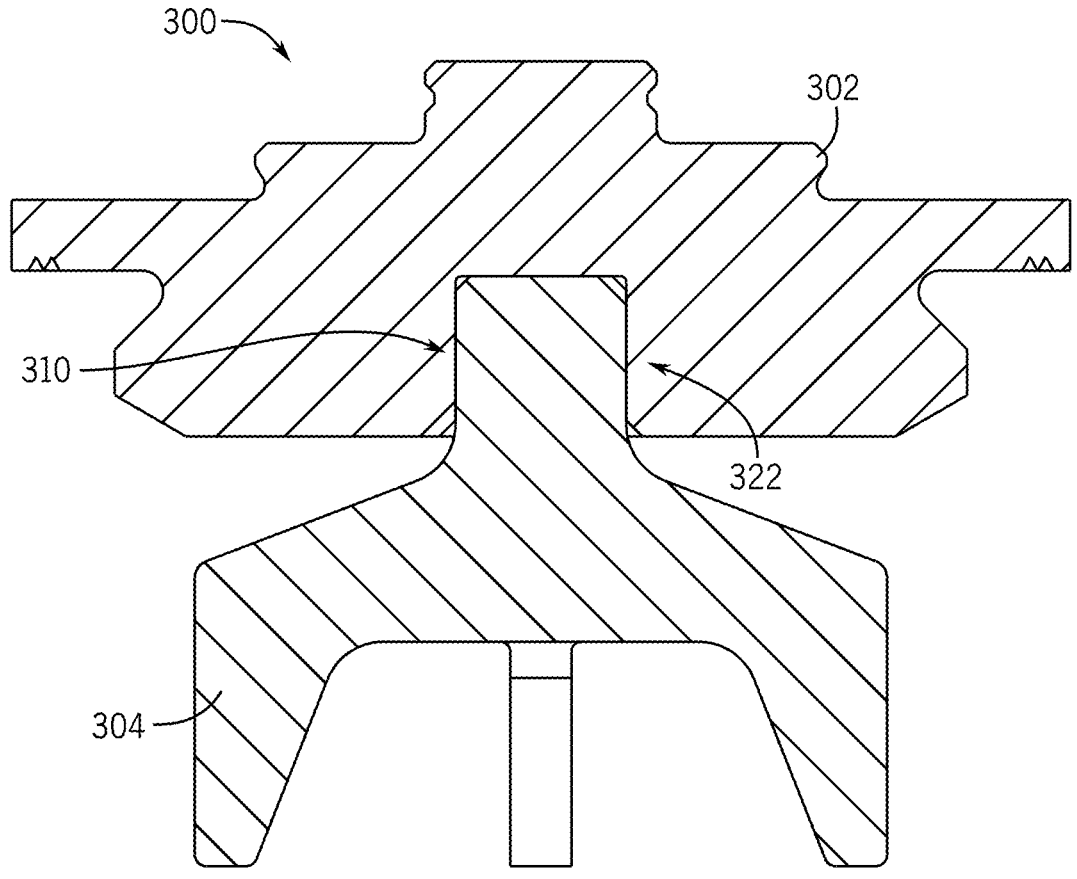
FIG. 3D is a cross sectional view of an embodiment of a valve member, in accordance with embodiments of the present disclosure.

FIG. 3B is an exploded view of the upper portion 302 and the guide legs 304 and FIG. 3C is a top perspective view of the valve member 300 illustrating the upper portion 302 and the guide legs 304. FIG. 3D is a cross-sectional view illustrating the upper portion 302 joined to the guide legs 304, for example via a press fit operation. As illustrated, the coupling member 322 extends into the cavity 310 to secure the guide legs 304 to the upper portion 302. It should be appreciated that various dimensions may be particularly selected based on one or more operating conditions. For example, a planar bottom surface of the upper portion 302 may be designed to be spaced a distance from the individual legs 320, and as a result, various dimensions, such as a cavity depth or a coupling member length, may be adjusted to accommodate such a design consideration.

Figure 4A:
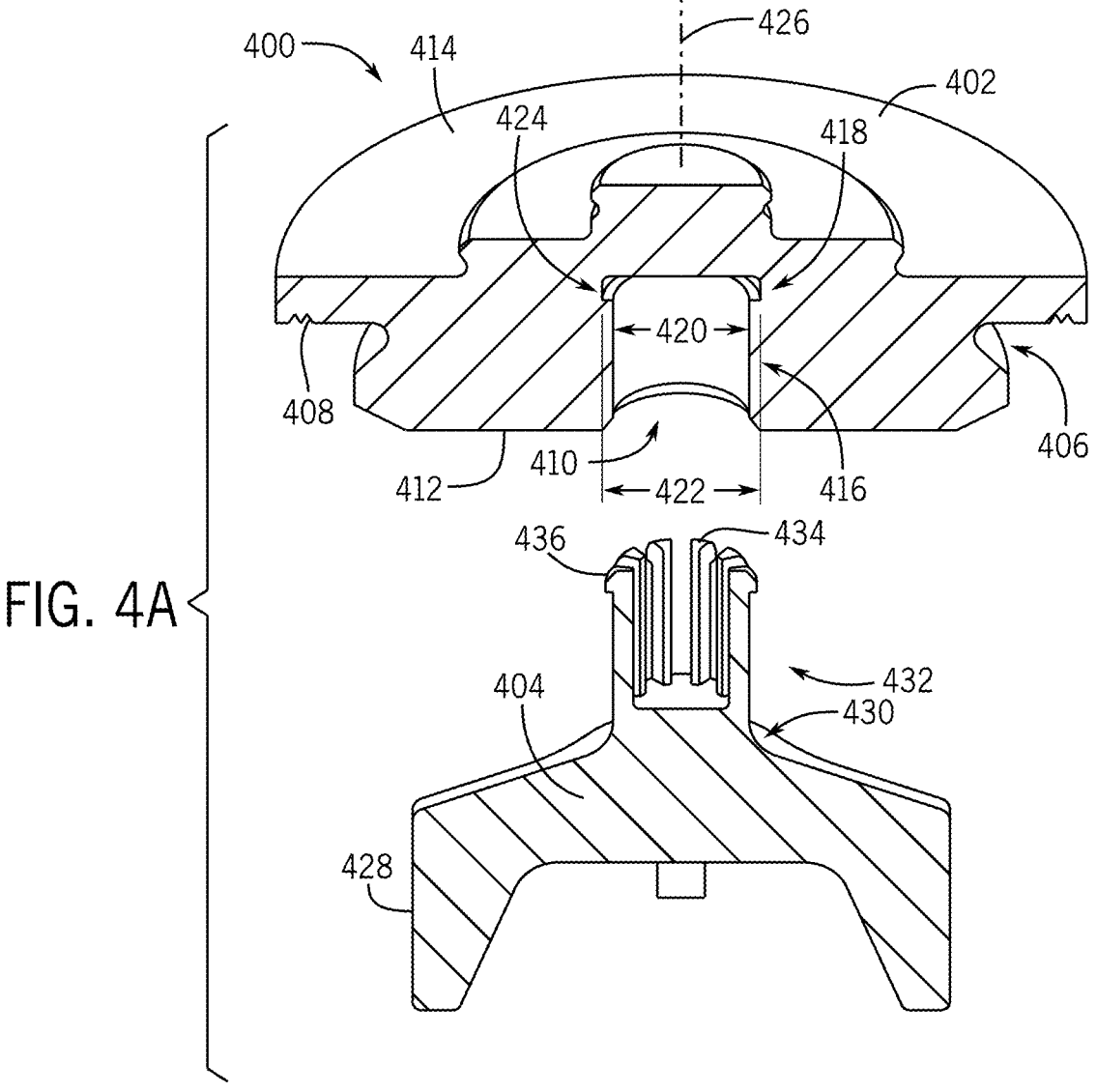
FIG. 4A is an exploded sectional view of an embodiment of a valve member, in accordance with embodiments of the present disclosure.

FIGS. 4A-4E illustrate a valve member 400 that may be formed using embodiments of the systems and methods disclosed herein. It should be appreciated that the valve member 400 may share one or more features with the valve member 300. FIG. 4A is a cross-sectional exploded view of an embodiment of the valve member 400 including an upper portion 402 (e.g., top portion, body, seal carrier, etc.) and guide legs 404 (e.g., guide leg assembly, legs, lower portion, etc.). In operation, the upper portion 402 will be joined to the guide legs 404 and utilized with a valve assembly. In this example, the upper portion 402 includes an annular recess 406 for receiving and supporting a seal element (not pictured) which may be a non-metallic seal element, such as an elastomer or the like. The recess 406 includes retention features 408 that may dig into or otherwise hold the seal element in place.

Further illustrated in FIG. 4A is a cavity 410 formed within an underside 412 of the upper portion 402. The cavity 410 in this example extends upwardly toward a top side 414 and includes a first portion 416 and a second portion 418. In this example, the first portion 416 has a first portion diameter 420 and the second portion 418 has a second portion diameter 422. The second portion diameter 422 is larger than the first portion diameter 420, thereby forming a shelf 424, which, as will be described below, may receive one or more components to facilitate coupling between the upper portion 402 and the guide legs 404. As shown in this example, each of the first and second portions 416, 418 are generally cylindrical and symmetrical about an axis 426, but it should be appreciated that such a configuration is for illustrative purposes only and the cavity may have a variety of different shapes and configurations. Furthermore, a single cavity is also for illustrative purposes and there may be multiple different cavities formed along the underside 414. The cavity 410 is further illustrated as being substantially centered along the axis 426 of the valve member 400, but this is for illustrative purposes only and the cavity 410 may be offset from the axis 426.

The guide legs 404 are illustrated decoupled from the upper portion 402, for example prior to an assembly process, such as a process that will be described herein. In various embodiments, the guide legs 404 include three legs 428, but it should be appreciated that there may be more or fewer legs 428 and three is just shown as an example. The guide legs 404 further includes a coupling member 430 that is adapted to engage the upper portion 402, for example via installation within the cavity 410. In this example, the coupling member 430 includes a plurality of fingers 432 (e.g., snap fingers) that may be biased to drive radially outward from the axis 426. In one or more embodiment, an inward radial force (e.g., toward the axis 426) may be applied to the fingers 432, for example via insertion of the fingers 432 into the cavity 410 to permit installation of the coupling member 430 within the cavity 410. As the coupling member 430 is driven through the cavity 410, upon interaction with the second portion 418, the fingers 432 may no longer be subjected to the inward radial force, thereby expanding outwardly to engage the larger diameter of the second portion 418. Thereafter, extensions 434 at the ends of the fingers 432 may engage the shelf 424 responsive to a downward force to separate the guide legs 404 from the upper portion 402. As noted above, a number of coupling members 430 may conform to a number of cavities 410 in various embodiments. Furthermore, there may be more or fewer coupling members 430 and/or cavities 410 which may function as identifiers or indications for installation of different types of guide legs 304.

The illustrated fingers 432 extend along the axis 426 and are positioned circumferentially about the axis 426. It should be appreciated that any number of fingers 432 may be used and that spacing between the fingers 432 may vary based on a particularly selected configuration. In this example, the extensions 434 are positioned on individual fingers 432, thereby facilitating flexing for each individual finger 432 responsive to interactions, for example interactions with a slanted region 436 along the extensions 434. It should be appreciated that an alternative configuration may also be considered where the cavity 410 is formed in the guide legs 404 and the coupling member 430 is formed on the upper portion 402. Accordingly, components such as the shelf 424 may also be positioned within the cavity 410 on the guide legs 404 and the fingers 432 may extend from the upper portion 402.

In operation, the guide legs 404 may be joined to the coupling member 424 via a press fitting or other linear force operation. By way of example, the guide legs 404 may be secured to a fixture along with a non-metallic sealing element. Thereafter, a metal sealing element and/or non-metallic seal carrier may be installed on the top of the fixture and a linear force may be applied to drive the three components together using a single operation. However, it should be appreciated that other methods may also be utilized join the components together. As an example, the guide legs 404 may be placed within a fixture along with the metal sealing element/non-metallic seal carrier at a top of the fixture. A linear force may be used to join the components together, and thereafter, the non-metallic element may be positioned within the fixture. The assembled components may then be positioned within the fixture and another linear force may drive the non-metallic seal onto the resident seal carrying ring.

Figure 4B:
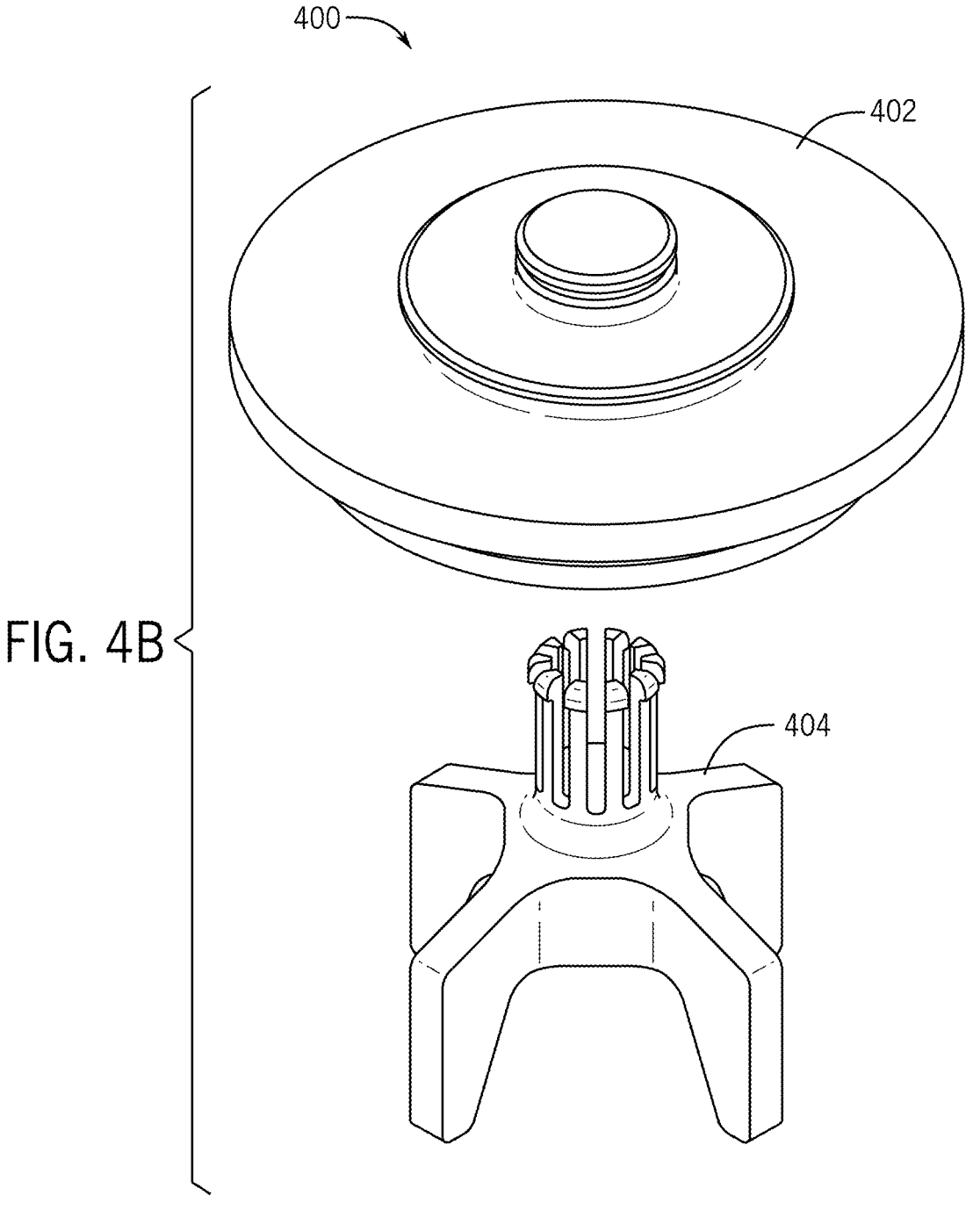
FIG. 4B is an exploded perspective view of an embodiment of a valve member, in accordance with embodiments of the present disclosure.
Figure 4C:
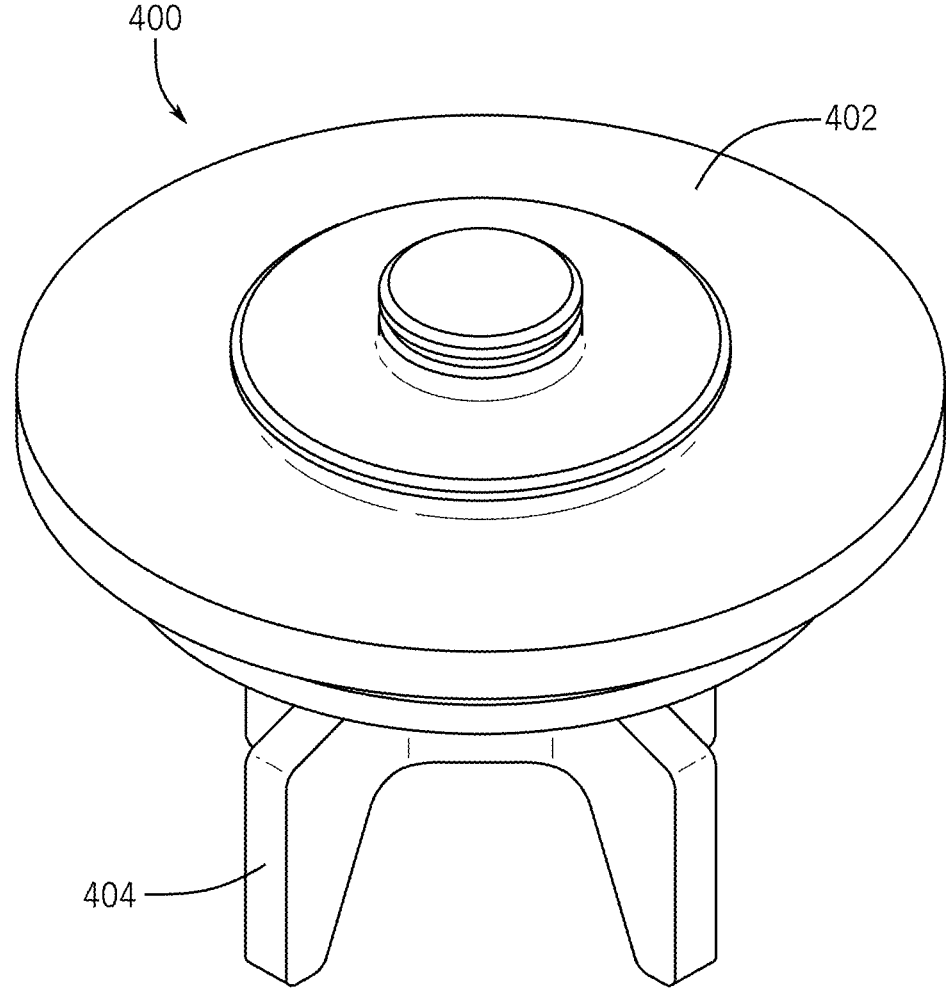
FIG. 4C is a top perspective view of an embodiment of a valve member, in accordance with embodiments of the present disclosure.
Figure 4D:
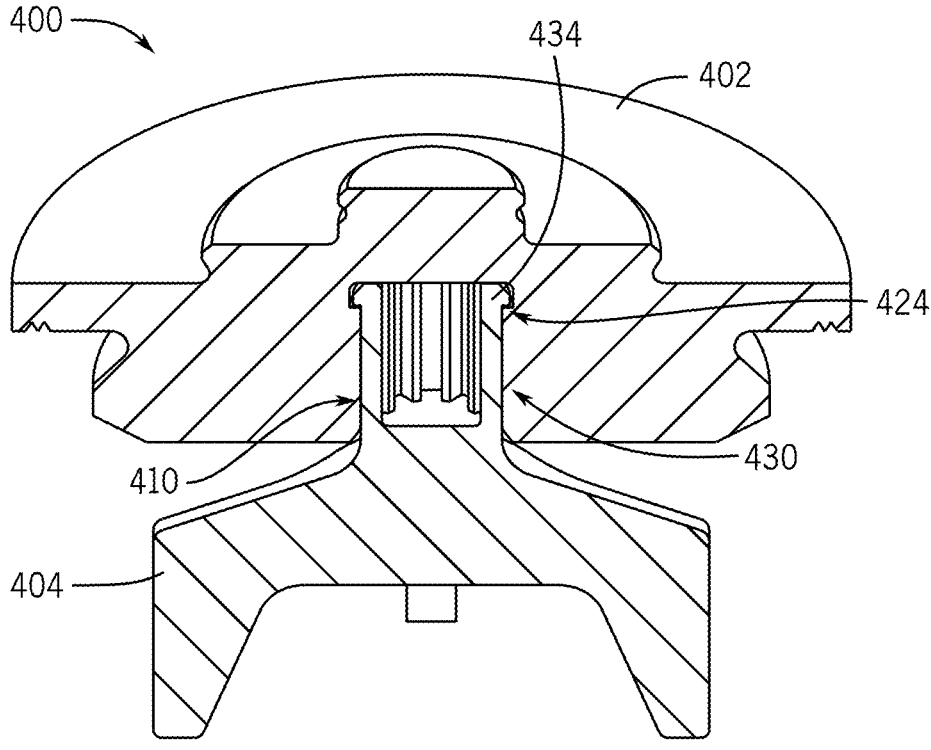
FIG. 4D is a sectional view of an embodiment of a valve member, in accordance with embodiments of the present disclosure.
Figure 4E:
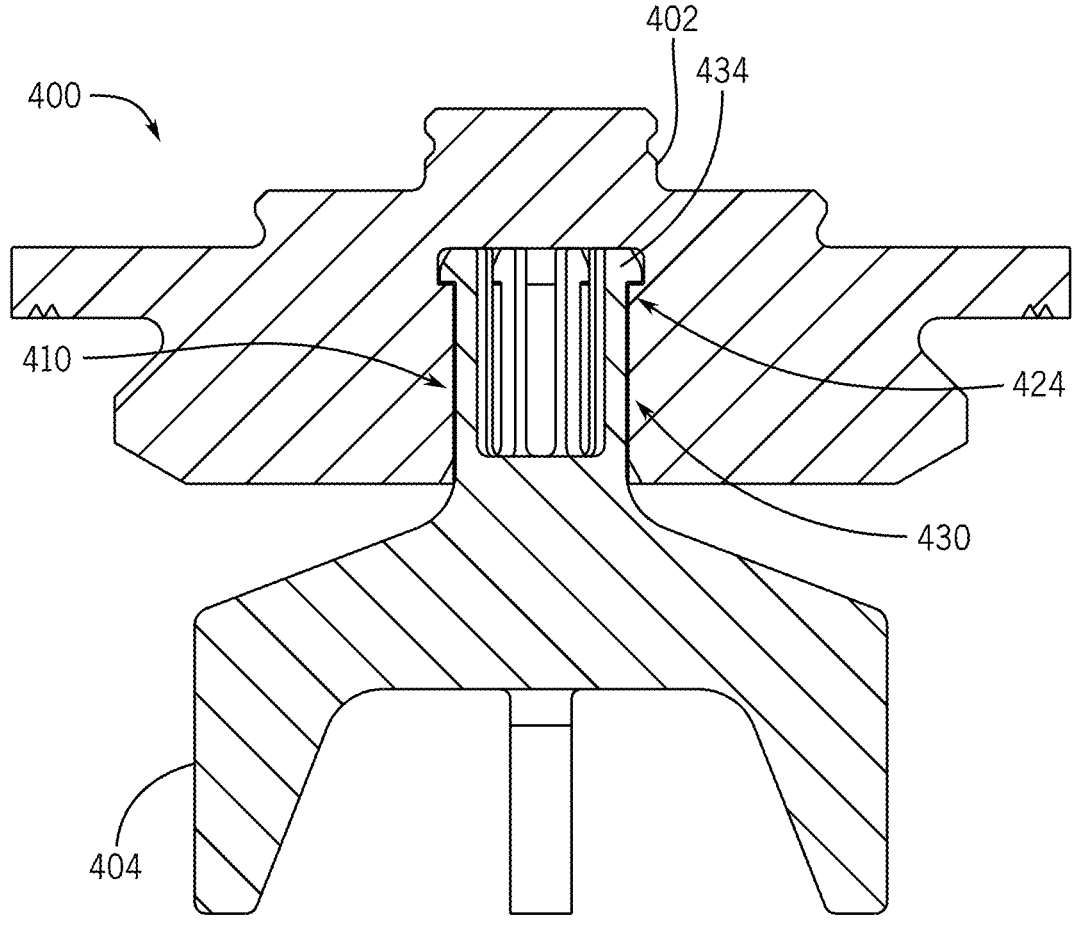
FIG. 4E is a cross sectional view of an embodiment of a valve member, in accordance with embodiments of the present disclosure.

FIG. 4B is an exploded view of the upper portion 402 and the guide legs 404 and FIG. 4C is a top perspective view of the valve member 400 illustrating the upper portion 402 and the guide legs 404. FIG. 4D is a sectional view and FIG. 4E is a cross-sectional view illustrating the upper portion 402 joined to the guide legs 404. As illustrated, the coupling member 430 extends into the cavity 410 to secure the guide legs 404 to the upper portion 402. For example, the extensions 434 are positioned over the shelf 424 to prevent separation of the guide legs 404 from the upper portion 402.

In various embodiments, at least a portion of the fingers 432 may be accessible after installation within the cavity 410, for example at a lower region of the coupling member 430. As a result, one or more tools may be utilized to compress or otherwise apply a radially inward force to the fingers 432, thereby facilitating removal of the guide legs 404 by driving the extensions 434 off of the shelf 424 to permit passage through the cavity 410. However, in various embodiments, the fingers 432 may be secured within the cavity 410 or otherwise shielded from external forces to reduce a likelihood of decoupling the guide legs 404 from the upper portion 402.

Figure 5A:
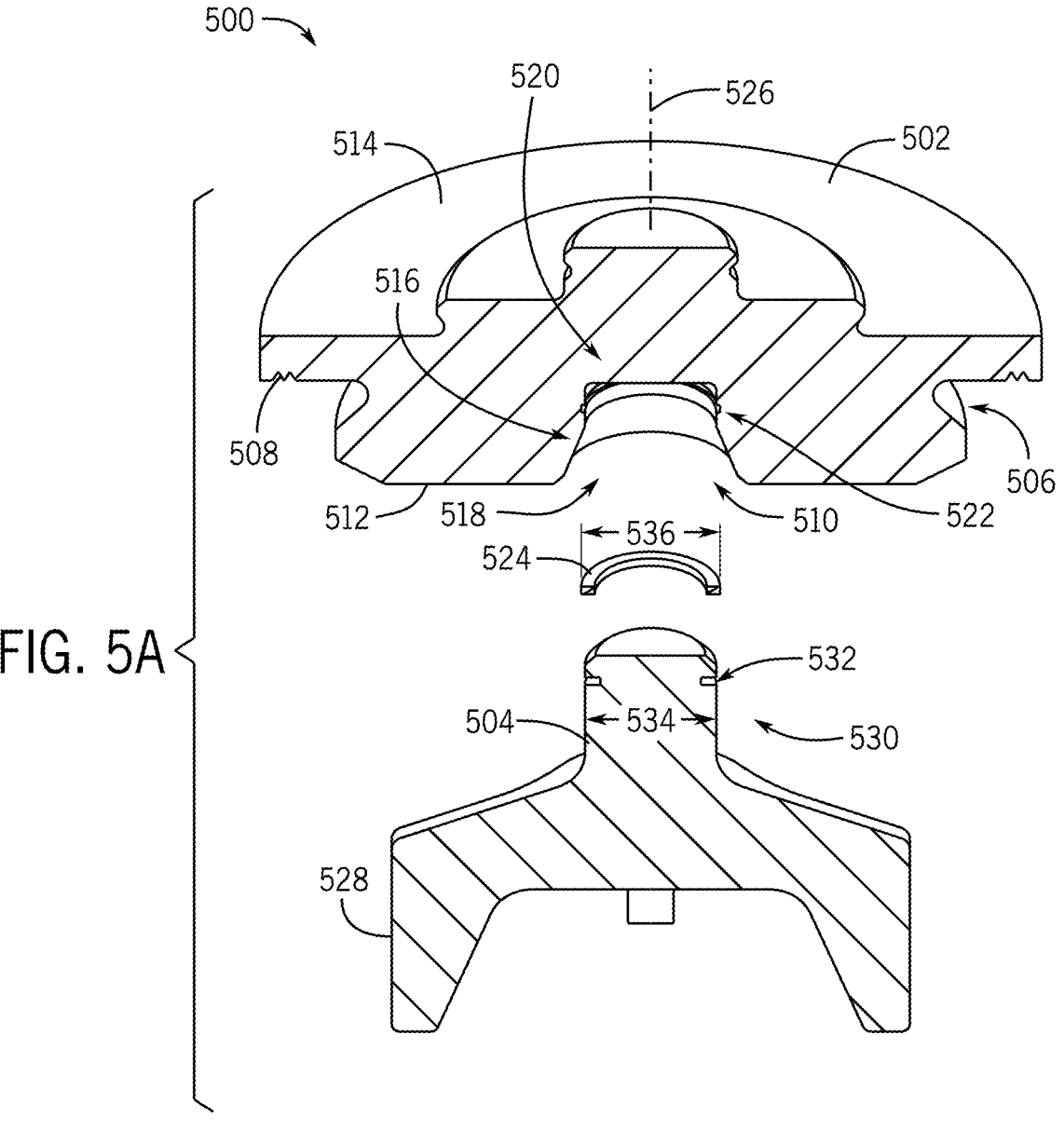
FIG. 5A is an exploded sectional view of an embodiment of a valve member, in accordance with embodiments of the present disclosure.

FIGS. 5A-5E illustrate a valve member 500 that may be formed using embodiments of the systems and methods disclosed herein. It should be appreciated that the valve member 500 may share one or more features with the valve members 300, 400. FIG. 5A is a sectional exploded view of an embodiment of the valve member 500 including an upper portion 502 (e.g., top portion, body, seal carrier, etc.) and guide legs 504 (e.g., guide leg assembly, legs, lower portion, etc.). In operation, the upper portion 502 will be joined to the guide legs 504 and utilized with a valve assembly. In this example, the upper portion 502 includes an annular recess 506 for receiving and supporting a seal element (not pictured) which may be a non-metallic seal element, such as an elastomer or the like. The recess 506 includes retention features 508 that may dig into or otherwise hold the seal element in place.

Further illustrated in FIG. 5A is a cavity 510 formed within an underside 512 of the upper portion 402. The cavity 510 in this example extends upwardly toward a top side 514 and includes a variable diameter 516 that is larger at a first end 518 than at a second end 520. Moreover, along the cavity 510, a groove 522 is formed, which may be utilized to receive a coupler 524, such as a snap ring, o-ring, and the like. In this example, the variable diameter 516 has a curved or arcuate profile, but it should be appreciated that this configuration is for illustrative purposes only and that in other embodiments there may be a different profile, such as a stepped profile or a sloped profile. In this example, the cavity 510 is arranged along and symmetrical about an axis 526, but it should be appreciated that such a configuration is for illustrative purposes only and the cavity may have a variety of different shapes and configurations. Furthermore, a single cavity is also for illustrative purposes and there may be multiple different cavities formed along the underside 512. The cavity 510 is further illustrated as being substantially centered along the axis 526 of the valve member 500, but this is for illustrative purposes only and the cavity 510 may be offset from the axis 526.

The guide legs 504 are illustrated decoupled from the upper portion 502, for example prior to an assembly process, such as a process that will be described herein. In various embodiments, the guide legs 504 include three legs 528, but it should be appreciated that there may be more or fewer legs 528 and three is just shown as an example. The guide legs 504 further include a coupling member 530 that is adapted to engage the upper portion 502, for example via installation within the cavity 510. In this example, the coupling member 530 includes an annular groove 532 to receive the coupler 524. As a result, upon installation of the coupler 524, a coupling member diameter 534 will be less than a coupler diameter 536, thereby facilitating engagement with the groove 522 formed in the cavity 510. For example, the coupling member 530 may be inserted into the cavity 510 until the coupler 524 engages the groove 522. In this manner, further movement of the guide legs 504 relative to the upper portion 502 may be blocked. It should be appreciated that an opposite configuration may also be considered where the cavity 510 is formed in the guide legs 504 and the coupling member 530 is formed on the upper portion 502. As an example, the groove 522 may be within the cavity 510 formed in the guide legs 504 while the coupler 542 is positioned within the groove 532 formed on the upper portion 502. Moreover in one or more embodiments, the coupler 524 may be integrally formed along the coupling member 530, for example, as an extension or the like.

In operation, the guide legs 504 may be joined to the coupling member 530 via a press fitting or other linear force operation. By way of example, the guide legs 504 may be secured to a fixture along with a non-metallic sealing element. Thereafter, a metal sealing element and/or non-metallic seal carrier may be installed on the top of the fixture and a linear force may be applied to drive the three components together using a single operation. However, it should be appreciated that other methods may also be utilized join the components together. As an example, the guide legs 504 may be placed within a fixture along with the metal sealing element/non-metallic seal carrier at a top of the fixture. A linear force may be used to join the components together, and thereafter, the non-metallic element may be positioned within the fixture. The assembled components may then be positioned within the fixture and another linear force may drive the non-metallic seal onto the resident seal carrying ring.

Figure 5B:
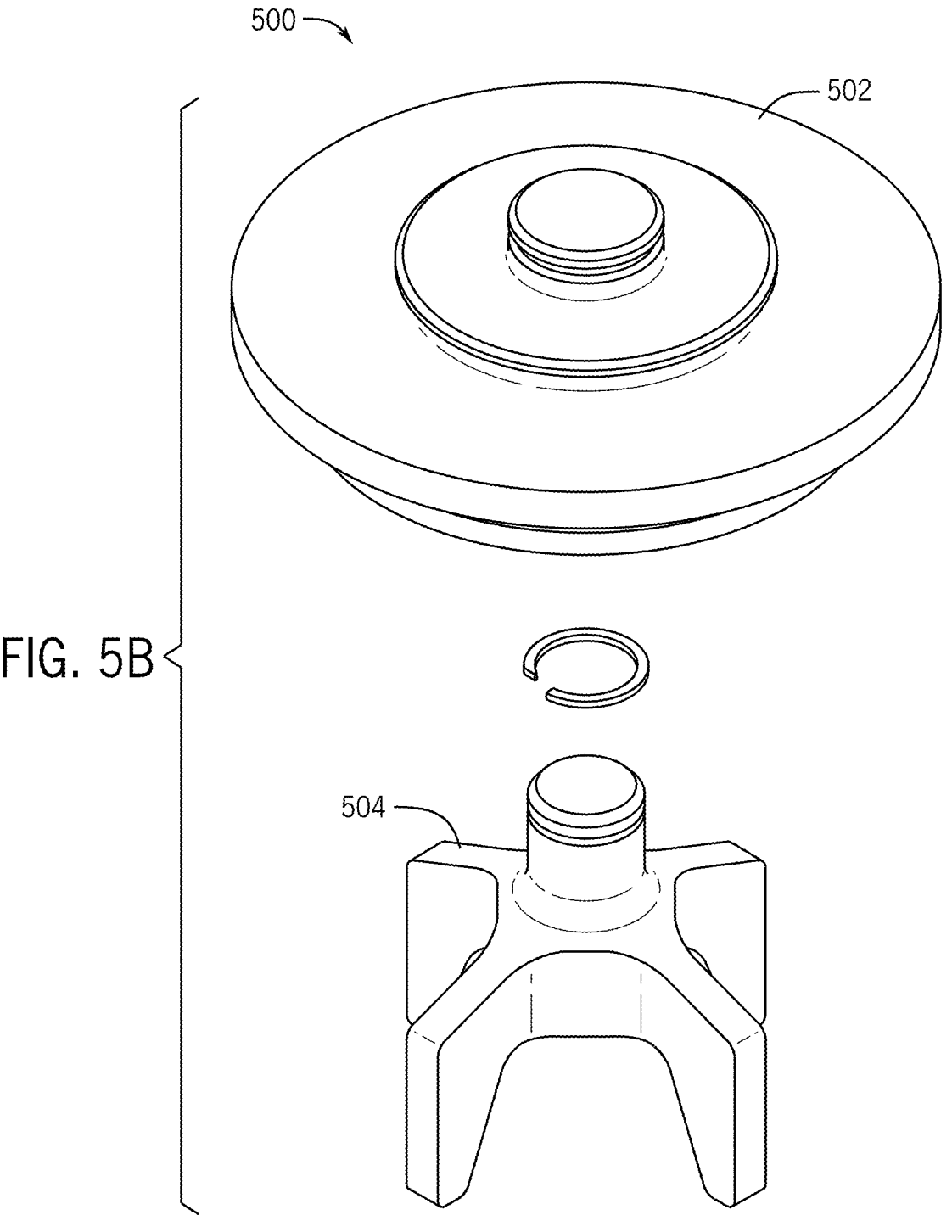
FIG. 5B is an exploded perspective view of an embodiment of a valve member, in accordance with embodiments of the present disclosure.
Figure 5C:
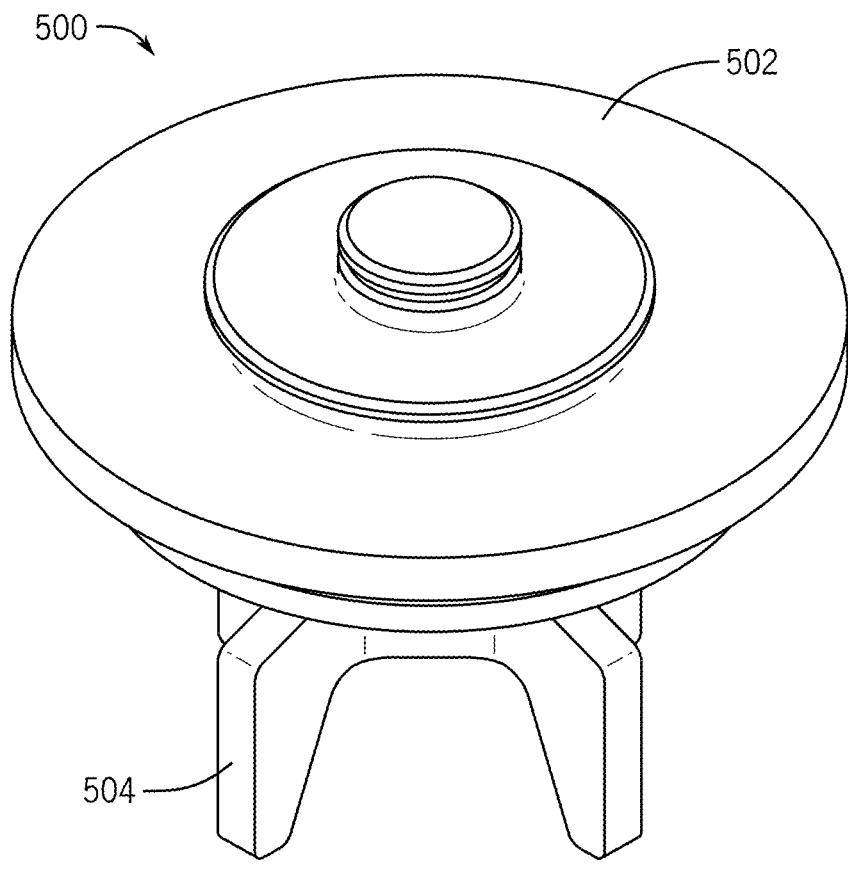
FIG. 5C is a top perspective view of an embodiment of a valve member, in accordance with embodiments of the present disclosure.
Figure 5D:
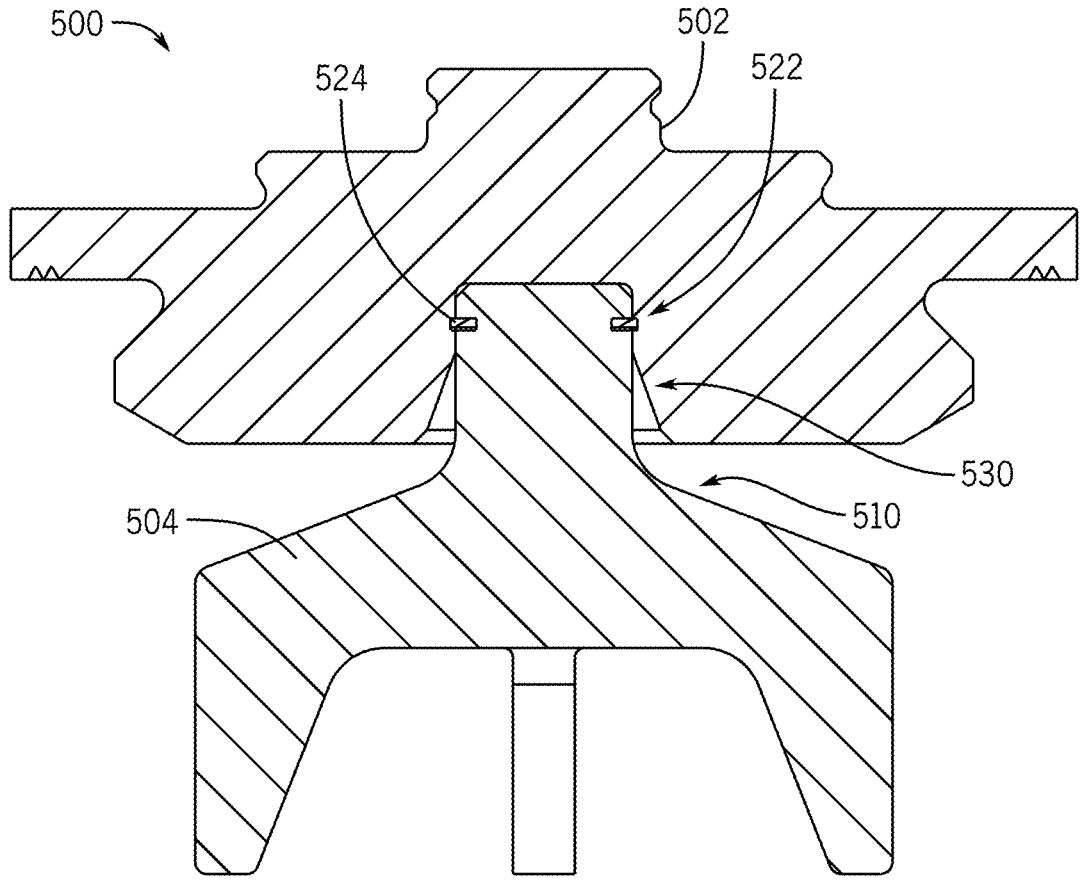
FIG. 5D is a cross sectional view of an embodiment of a valve member, in accordance with embodiments of the present disclosure.
Figure 5E:
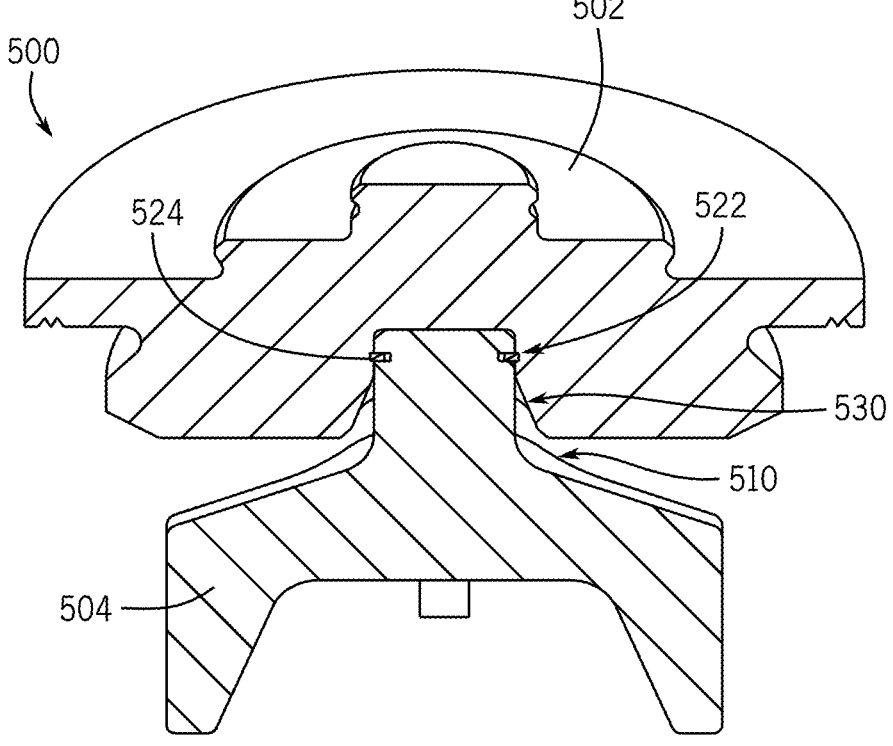
FIG. 5E is a sectional view of an embodiment of a valve member, in accordance with embodiments of the present disclosure.

FIG. 5B is an exploded view of the upper portion 502 and the guide legs 504 and FIG. 5C is a top perspective view of the valve member 500 illustrating the upper portion 502 and the guide legs 504. FIGS. 5D and 5E are cross-sectional views illustrating the upper portion 502 joined to the guide legs 504. As illustrated, the coupling member 530 extends into the cavity 510 to secure the guide legs 504 to the upper portion 502. For example, the coupler 524 is aligned with the groove 522 to block further movement of the guide legs 504.

As shown in FIG. 5B, the coupler 524 may be configured as a ring with an open end such that the coupler 524 may be stretched or otherwise deformed to be positioned within the groove 522 (FIA. 5A). In at least one embodiment, one or more connectors may further be arranged along the coupler 524 to join the ends together, such as a threaded fitting. However, it should be appreciated that a force of the coupler 524 contracting against a stretched out position around the groove 522 may be sufficient to maintain a position of the coupler 524 within the groove 522.

Figure 6:
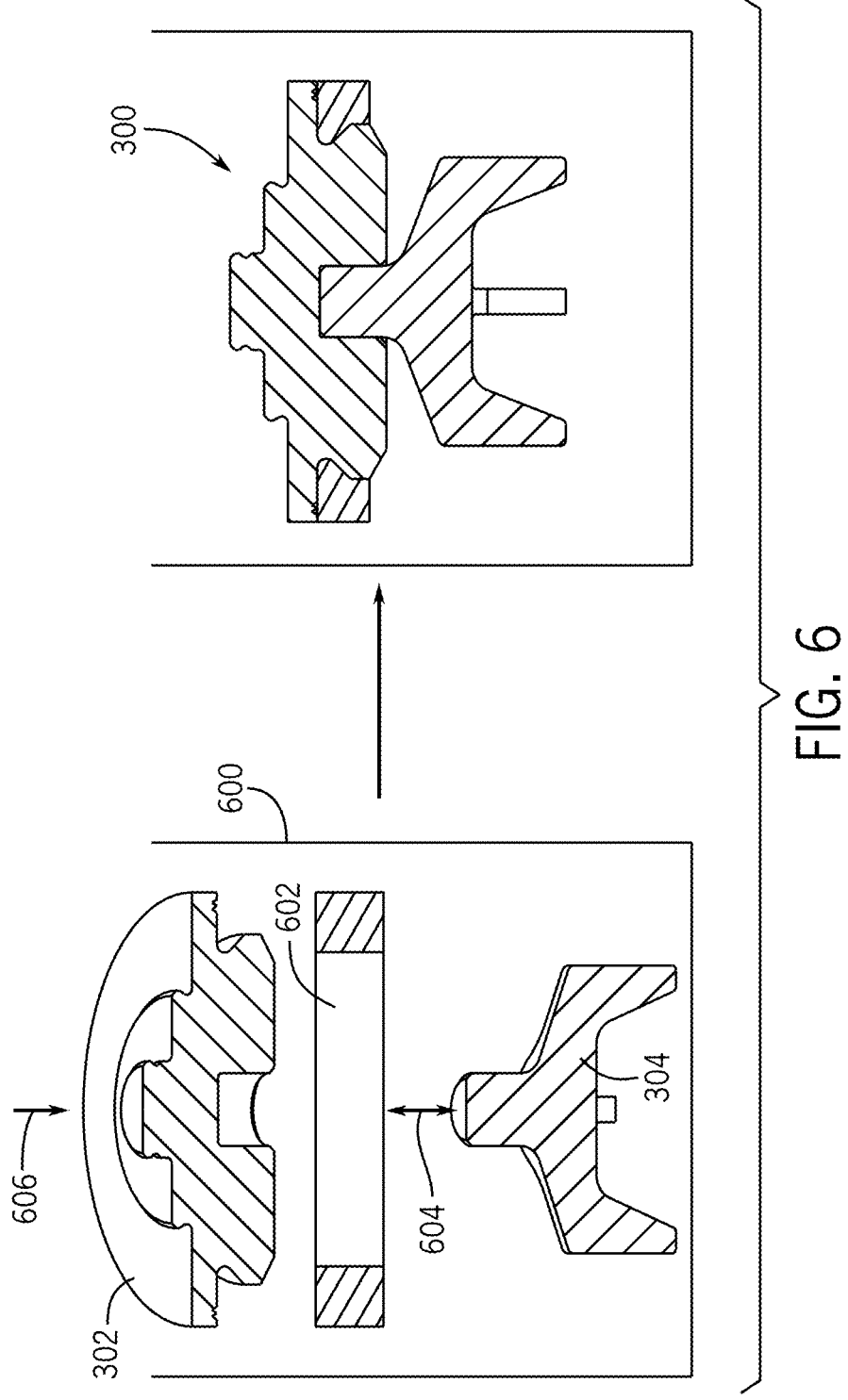
FIG. 6 is a schematic diagram of an embodiment of a method for forming a valve member, in accordance with embodiments of the present disclosure.

FIG. 6 is a schematic diagram of a method for assembling a valve assembly. It should be appreciated that one or more of the valve assemblies 300, 400, 500 may be assembled using this process, but numbering with respect to assembly 300 is used for simplicity. In this example, the upper portion 302 is arranged within a fixture 600 axially above a sealing element 602 and the guide legs 304. It should be appreciated that an axial distance 604 may separate one or more of the components. A force 606 is applied to generate the valve assembly 300. In various embodiments, assembly is performed with a single force application, rather than in a multi-step process. The force 606 may be considered a linear force, as the force is aligned with an axis of the valve member 300 (such as axis 318 in FIG. 3A). The force 606 in this example is shown in a downward direction (e.g., applied to the top portion 302 toward the guide legs 304), but it should be appreciated that alternative configurations may apply the force 606 to the guide legs 304 in an upward direction. Furthermore, it should be appreciated that the illustrated configuration may be flipped 180 degrees such that the top portion 304 is arranged within the fixture 600 such that the cavity 310 is pointing in an upward direction (e.g., opposite the direction of the force 606) and the guide legs 304 may be flipped 180 degrees such that the coupling member 322 is pointed in a downward direction (e.g., along the direction of the force 606) to engage the cavity 310.

Figure 7:
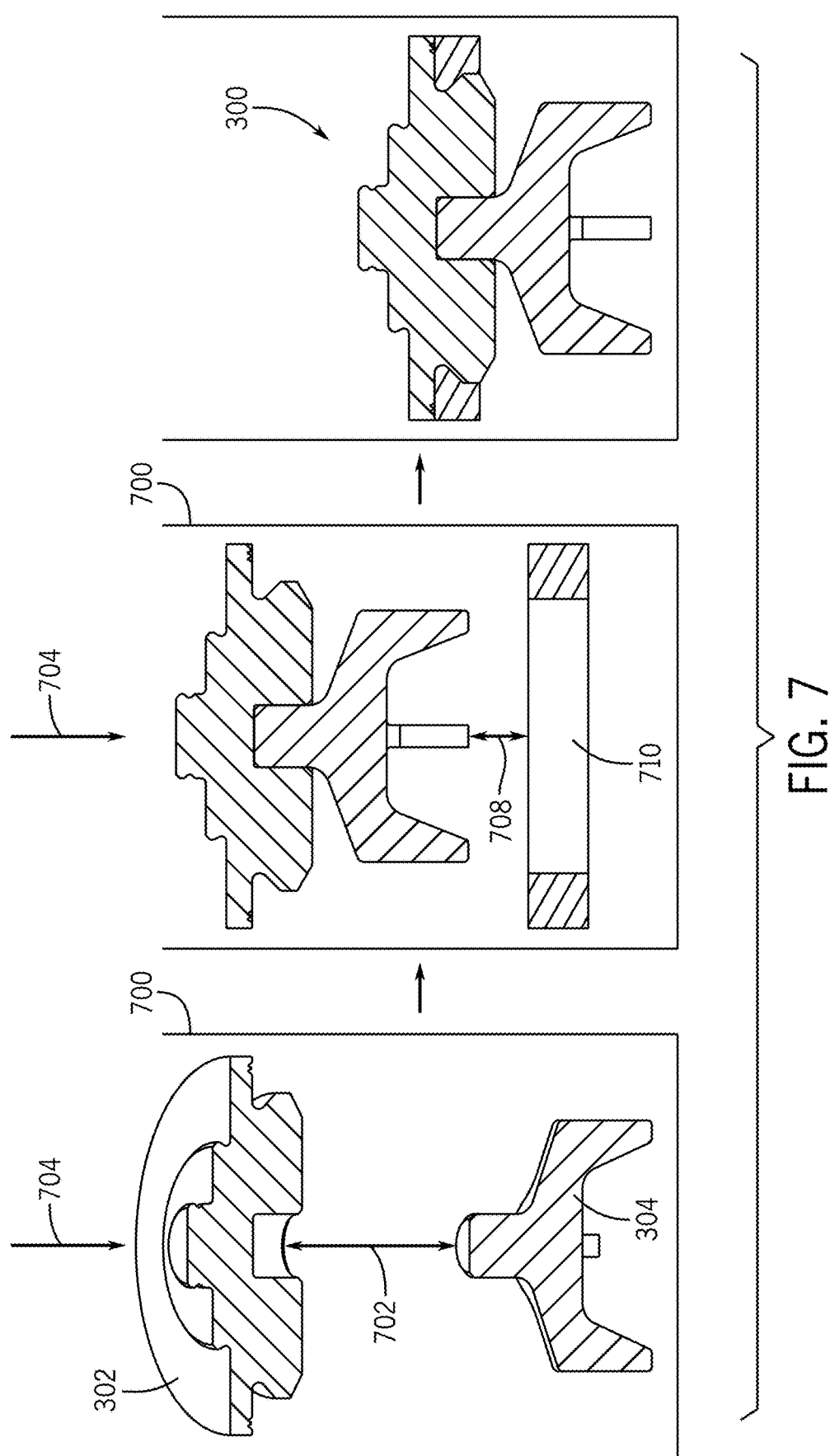
FIG. 7 is a schematic diagram of an embodiment of a method for forming a valve member, in accordance with embodiments of the present disclosure.

FIG. 7 is a schematic diagram of a method for assembling a valve assembly. It should be appreciated that one or more of the valve assemblies 300, 400, 500 may be assembled using this process, but numbering with respect to assembly 300 is used for simplicity. In this example, the upper portion 302 is arranged within a fixture 700 axially above the guide legs 304. It should be appreciated that an axial distance 702 may separate the components. A force 704 is applied to generate an intermediate assembly 706. As shown, the force 704 is in a downward direction (e.g., applied to the upper portion 302 to drive the upper portion 302 toward the guide legs 304), but in other embodiments, the force 704 may be an upward force that drives the guide legs 304 toward the upper portion 302. Furthermore, as noted with respect to FIG. 7, configurations may flip the components by 180 degrees such that upper portion 302 is within the fixture 700 and the guide legs 304 are driven in a downward direction via the force 704.

Continuing with the assembly, the intermediate assembly 706 is positioned an axial distance 708 from a sealing element 710. It should be appreciated that the axial distance 708 may be greater than, less than, or equal to the axial distance 702. Thereafter, the force 704 is applied to form the valve assembly 300. In various embodiments, assembly is performed with two force applications, where the magnitude of the force applications may be different for different parts of the assembly process. Moreover, it should be appreciated that the relative positions of the components may be changed in different embodiments.

Figure 8A:
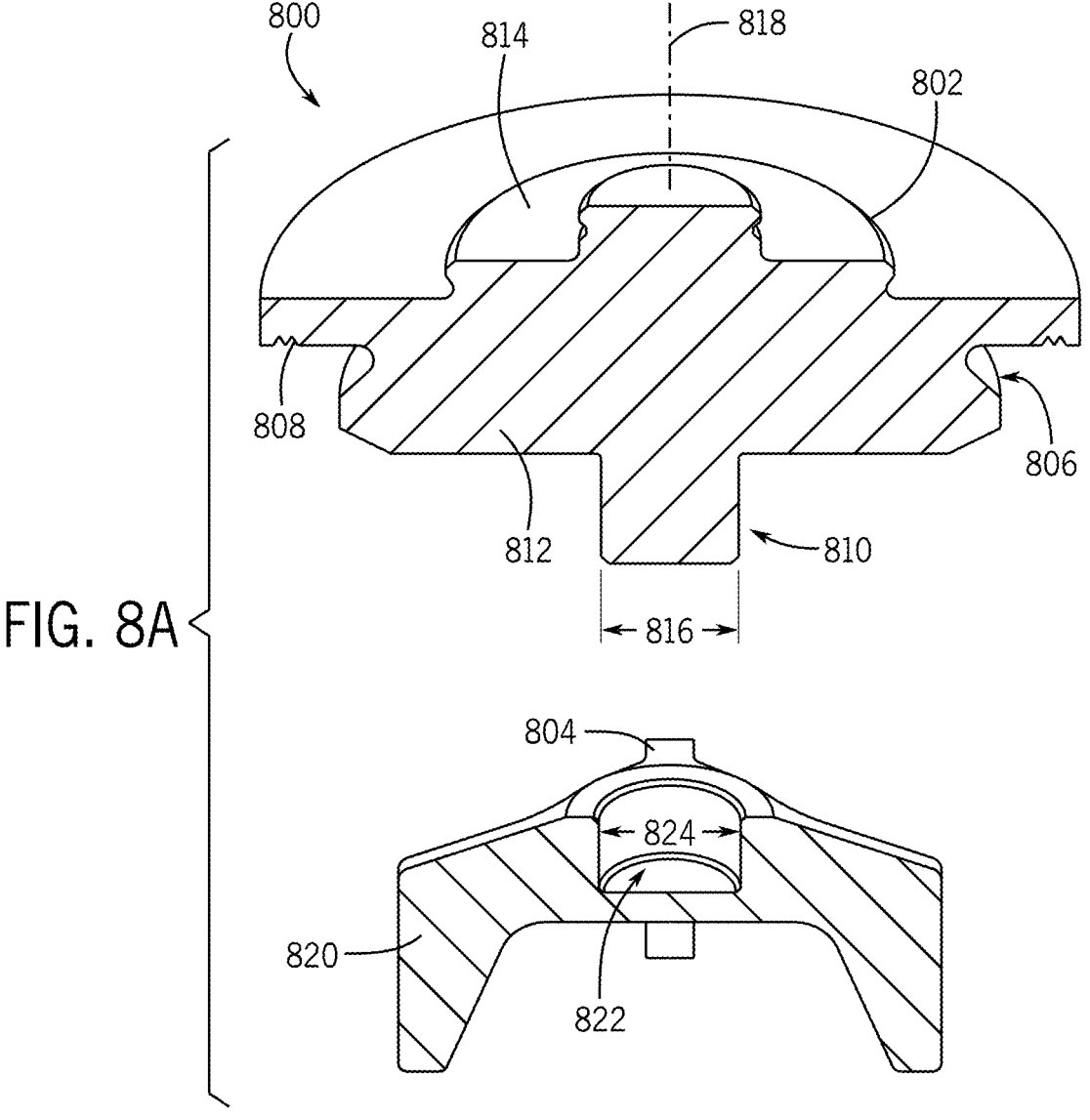
FIG. 8A is an exploded sectional view of an embodiment of a valve member, in accordance with embodiments of the present disclosure.

FIGS. 8A-8D illustrate a valve member 800 that may be formed using embodiments of the systems and methods disclosed herein. It should be appreciated that the valve member 800 may share one or more features with the valve members 300, 400, 500 described herein. FIG. 8A is a sectional exploded view of an embodiment of the valve member 800 including an upper portion 802 (e.g., top portion, body, seal carrier, etc.) and guide legs 804 (e.g., guide leg assembly, legs, lower portion, etc.). In operation, the upper portion 802 will be joined to the guide legs 804 and utilized with a valve assembly. In this example, the upper portion 802 includes an annular recess 806 for receiving and supporting a seal element (not pictured) which may be a non-metallic seal element, such as an elastomer or the like. The recess 806 includes retention features 808 that may dig into or otherwise hold the seal element in place.

Further illustrated in FIG. 8A is a coupling member 810 extending axially away from an underside 812 of the upper portion 402. The cavity 510 in this example extends downwardly away from a top side 814 and underside 812 and includes a substantially constant diameter 816. It should be appreciated that the diameter 816 may be variable or change at various locations based on anticipated design conditions and the constant diameter is shown for illustrative purposes only. In this example, the coupling member 810 is arranged along and symmetrical to an axis 818, but it should be appreciated that such a configuration is for illustrative purposes only and the coupling member 810 may have a variety of different shapes and configurations. Furthermore, a single coupling member 810 is also for illustrative purposes and there may be multiple different coupling members formed along the underside 812. As noted above, different configurations of coupling members 810 may be utilized for identification purposes. The coupling member 810 is further illustrated as being substantially centered along the axis 818 of the valve member 800, but this is for illustrative purposes only and the coupling member 810 may be offset from the axis 818.

The guide legs 804 are illustrated decoupled from the upper portion 802, for example prior to an assembly process, such as a process described herein. In various embodiments, the guide legs 804 include three legs 820, but it should be appreciated that there may be more or fewer legs 820 and three is just shown as an example. The guide legs 804 further includes a cavity 822 that is adapted to engage the upper portion 802, for example via installation of the coupling member 810. In this example, the cavity 822 includes cavity diameter 824 that is substantially equal to the coupling member cavity 816, which may enable a press or interference fit to join the components together.

In operation, the guide legs 804 may be joined to the upper portion 802 via a press fitting or other linear force operation. By way of example, the guide legs 804 may be secured to a fixture along with a non-metallic sealing element. Thereafter, a metal sealing element and/or non-metallic seal carrier may be installed on the top of the fixture and a linear force may be applied to drive the three components together using a single operation. However, it should be appreciated that other methods may also be utilized join the components together. As an example, the guide legs 804 may be placed within a fixture along with the metal sealing element/non-metallic seal carrier at a top of the fixture. A linear force may be used to join the components together, and thereafter, the non-metallic element may be positioned within the fixture. The assembled components may then be positioned within the fixture and another linear force may drive the non-metallic seal onto the resident seal carrying ring.

Figure 8B:
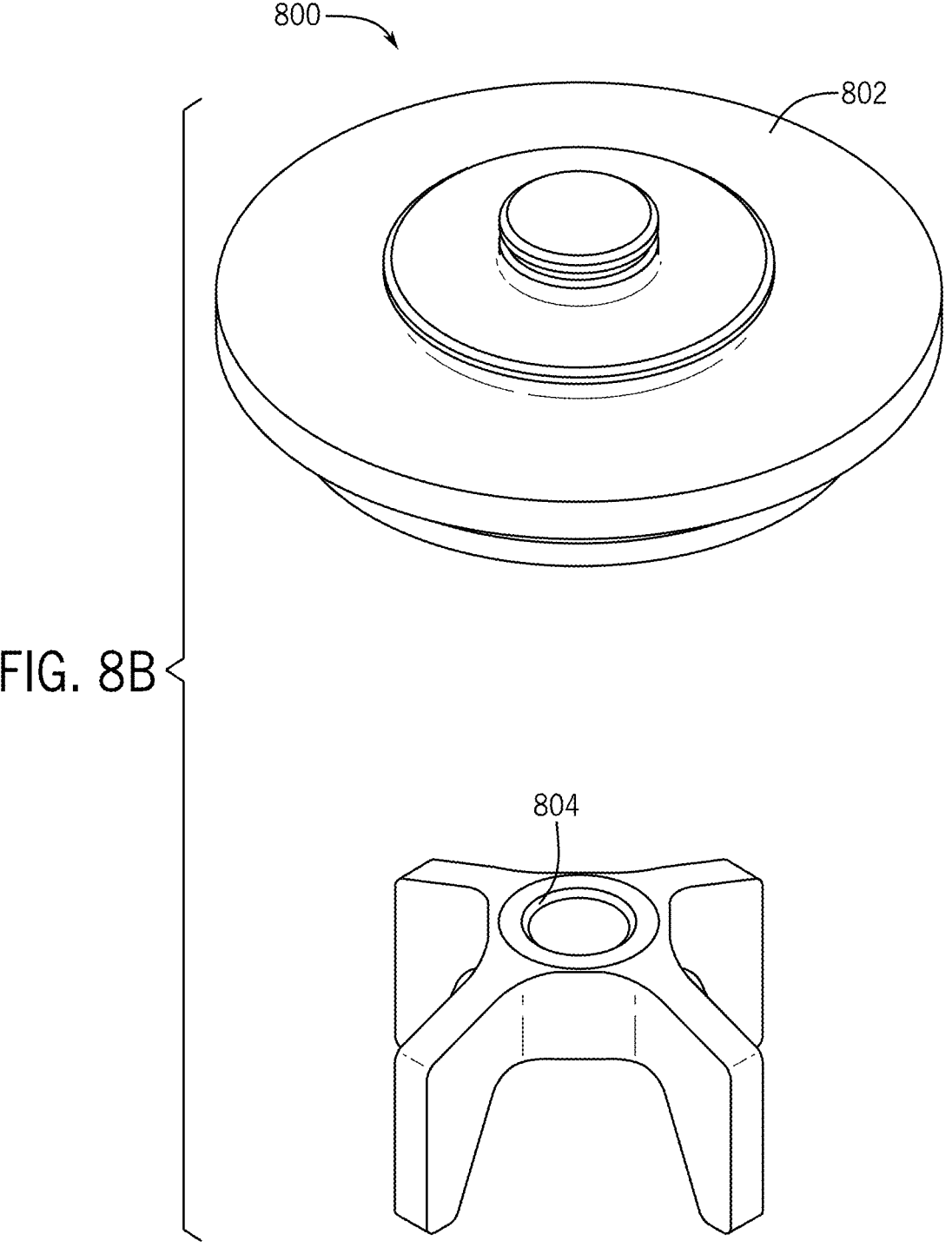
FIG. 8B is an exploded perspective view of an embodiment of a valve member, in accordance with embodiments of the present disclosure.
Figure 8C:
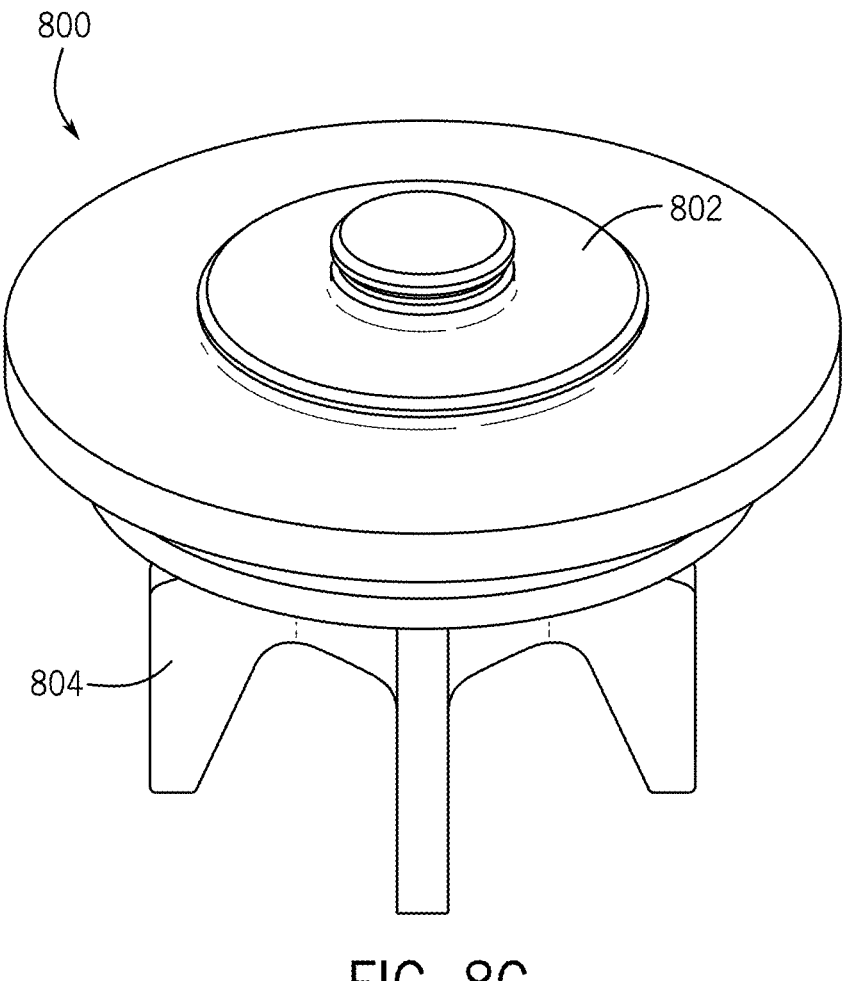
FIG. 8C is a top perspective view of an embodiment of a valve member, in accordance with embodiments of the present disclosure.
Figure 8D:
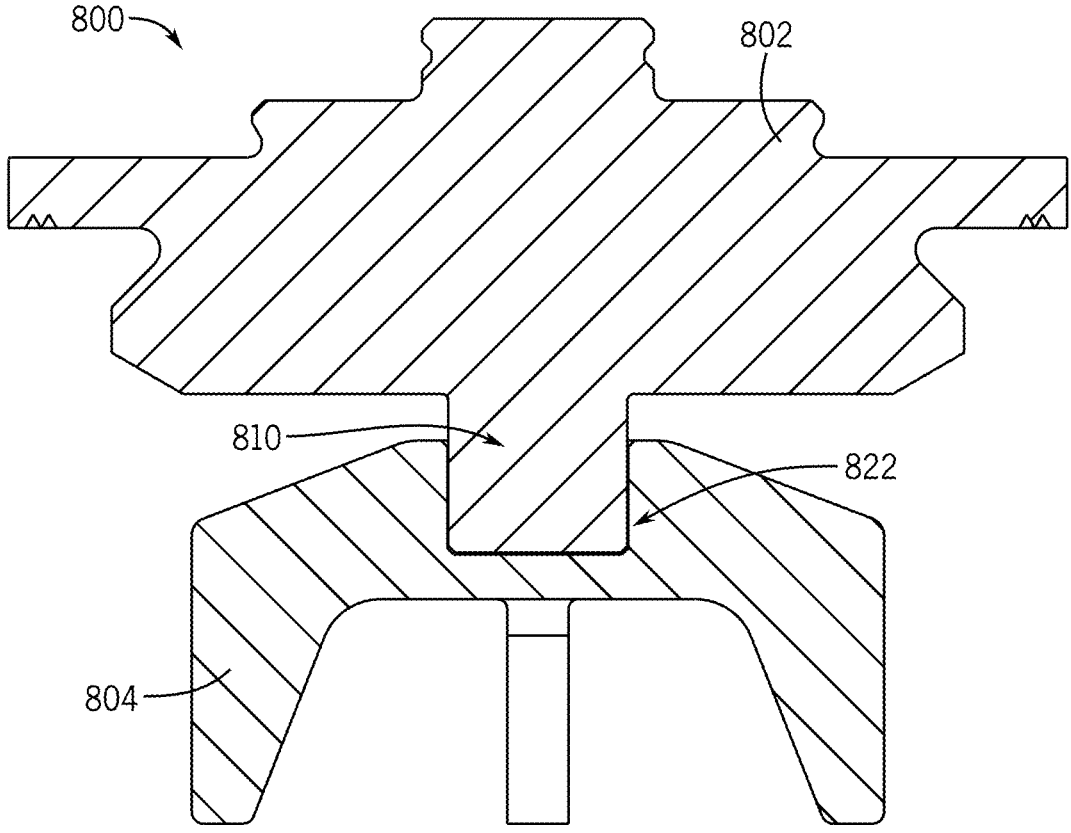
FIG. 8D is a cross sectional view of an embodiment of a valve member, in accordance with embodiments of the present disclosure.

FIG. 8B is an exploded view of the upper portion 802 and the guide legs 804 and FIG. 8C is a top perspective view of the valve member 800 illustrating the upper portion 802 and the guide legs 804. FIG. 4D is a cross-sectional view illustrating the upper portion 802 joined to the guide legs 804. As illustrated, the coupling member 810 extends into the cavity 822 to secure the guide legs 804 to the upper portion 802.

Figure 9A:
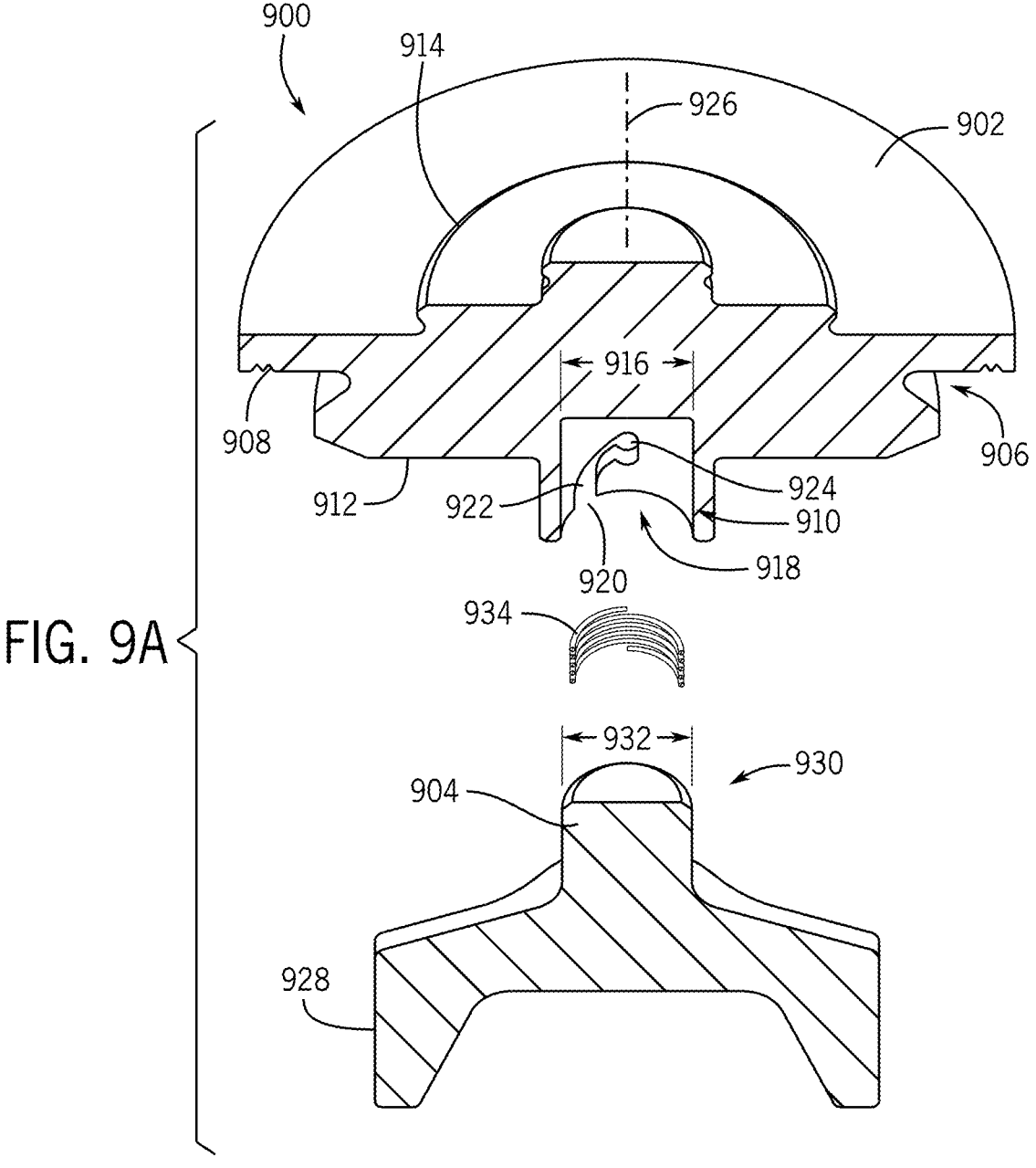
FIG. 9A is an exploded sectional view of an embodiment of a valve member, in accordance with embodiments of the present disclosure.

FIGS. 9A-9F illustrate a valve member 900 that may be formed using embodiments of the systems and methods disclosed herein. It should be appreciated that the valve member 900 may share one or more features with the valve members 300, 400, 500, 800. FIG. 9A is a cross-sectional exploded view of an embodiment of the valve member 900 including an upper portion 902 (e.g., top portion, body, seal carrier, etc.) and guide legs 904 (e.g., guide leg assembly, legs, lower portion, etc.). In operation, the upper portion 902 will be joined to the guide legs 904 and utilized with a valve assembly. In this example, the upper portion 902 includes an annular recess 906 for receiving and supporting a seal element (not pictured) which may be a non-metallic seal element, such as an elastomer or the like. The recess 906 includes retention features 908 that may dig into or otherwise hold the seal element in place.

Further illustrated in FIG. 9A is a cavity 910 formed within an underside 912 of the upper portion 902. The cavity 910 in this example extends upwardly toward a top side 914 and includes a constant cavity diameter 916, but it should be appreciated that the diameter may be a variable diameter in other embodiments, as described herein. However, various portions of the cavity 910 includes a cutout 918 that may be utilized with a bayonet style connection between the upper portion 902 and the guide legs 904. In this example, the cutout 918 includes an entry 920, a curved portion 922, and a receptacle 924, but these components are shown for illustration only. By way of example, the curved portion 922 may be different shapes, such as a stepped portion or a portion that is fully revolved around the cavity 910, among other options. For example, in one or more embodiments, the cutout 918 may be considered a J-slot type of connection, but as noted above, various configurations may be utilized that fall within the scope of the present disclosure. As will be described, a peg or extension from the guide legs 904 may be inserted through the entry 920, rotated along the curved portion 922, and then positioned within the receptacle 924 to secure the guide legs 904 to the upper portion 902.

In this example, the cavity 910 is arranged along an axis 926, but it should be appreciated that such a configuration is for illustrative purposes only and the cavity may have a variety of different shapes and configurations. Furthermore, a single cavity 910 is also for illustrative purposes and there may be multiple different cavities formed along the underside 912. The cavity 910 is further illustrated as being substantially centered along the axis 926 of the valve member 900, but this is for illustrative purposes only and the cavity 910 may be offset from the axis 926. Moreover, as noted above with respect to other configurations, the cavity 910 may also be formed within the guide legs 904 to provide an opposing configuration to the one shown in FIG. 9A.

The guide legs 904 are illustrated decoupled from the upper portion 902, for example prior to an assembly process, such as a process that will be described herein. In various embodiments, the guide legs 904 include three legs 928, but it should be appreciated that there may be more or fewer legs 928 and three is just shown as an example. The guide legs 904 further includes a coupling member 930 that is adapted to engage the upper portion 902, for example via installation within the cavity 910. In this example, a pin or extension associated with the coupling member 930 is not visible, but will be illustrated in subsequent views. In this example, a coupling member diameter 932 is substantially equal to the cavity diameter 916, but for the extension (not pictured). Further illustrated in FIG. 9A is a resilient member 934, such as a spring, that will be positioned between at least a portion of the cavity 910 and the coupling member 930. In operation, the resilient member 934 will drive the extension (not pictured) against the receptacle to block separation of the guide legs 904 from the upper portion. It should be appreciated that an opposite configuration may also be considered where the cavity 910 is formed in the guide legs 504 and the coupling member 930 is formed on the upper portion 902.

In operation, the guide legs 904 may be joined to the coupling member 930 via a press fitting or other linear force operation. By way of example, the guide legs 904 may be secured to a fixture along with a non-metallic sealing element. Thereafter, a metal sealing element and/or non-metallic seal carrier may be installed on the top of the fixture and a linear force may be applied to drive the three components together using a single operation. Moreover, a twisting operation may also be applied to facilitate movement of the extension (not pictured) along the curved portion 922. However, it should be appreciated that the linear force may be sufficient to drive the extension (not pictured) along the curved portion 922. Moreover, it should be appreciated that other methods may also be utilized join the components together. As an example, the guide legs 904 may be placed within a fixture along with the metal sealing element/non-metallic seal carrier at a top of the fixture. A linear force may be used to join the components together, and thereafter, the non-metallic element may be positioned within the fixture. The assembled components may then be positioned within the fixture and another linear force may drive the non-metallic seal onto the resident seal carrying ring.

Figure 9B:
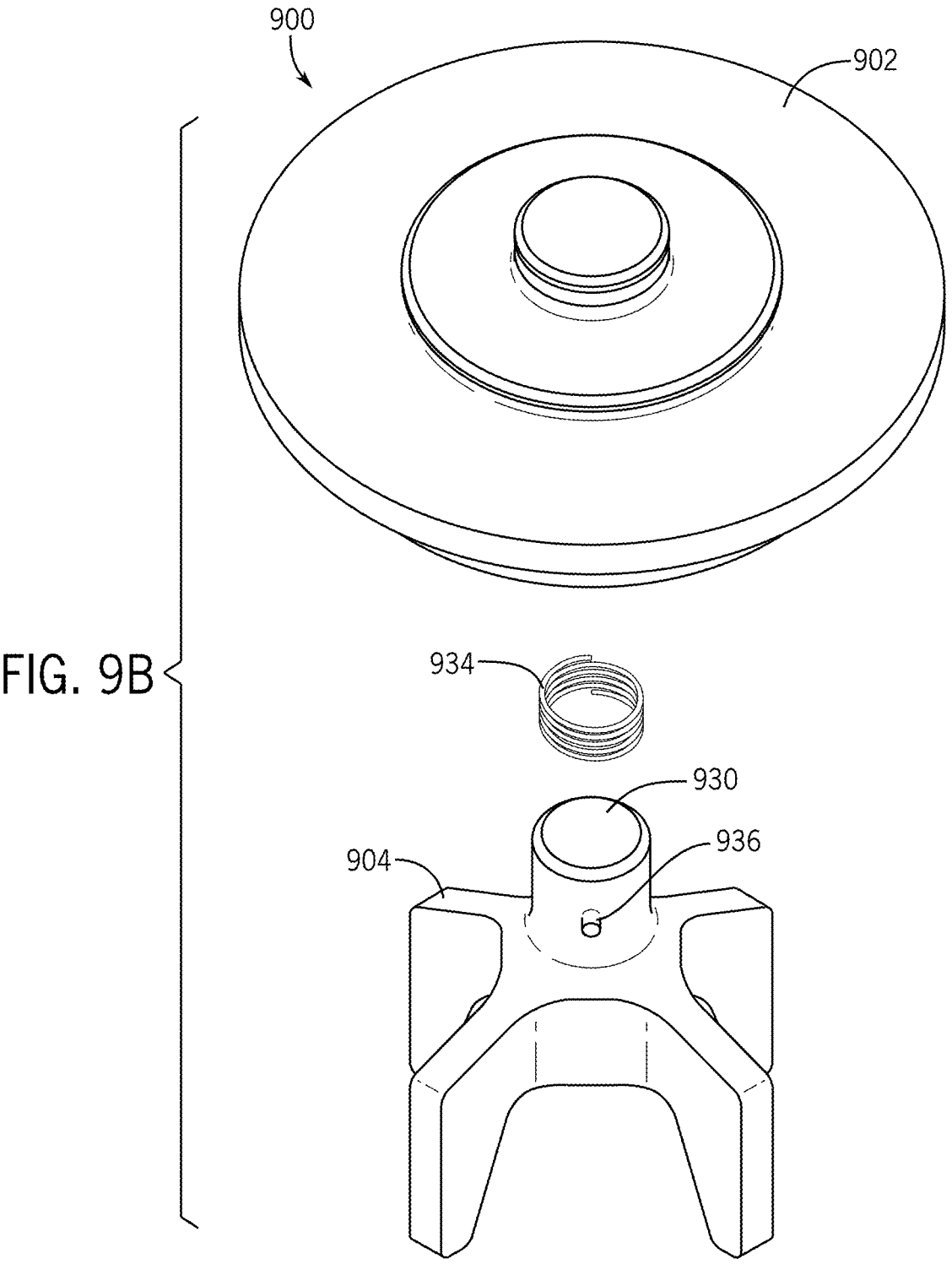
FIG. 9B is an exploded perspective view of an embodiment of a valve member, in accordance with embodiments of the present disclosure.
Figure 9C:
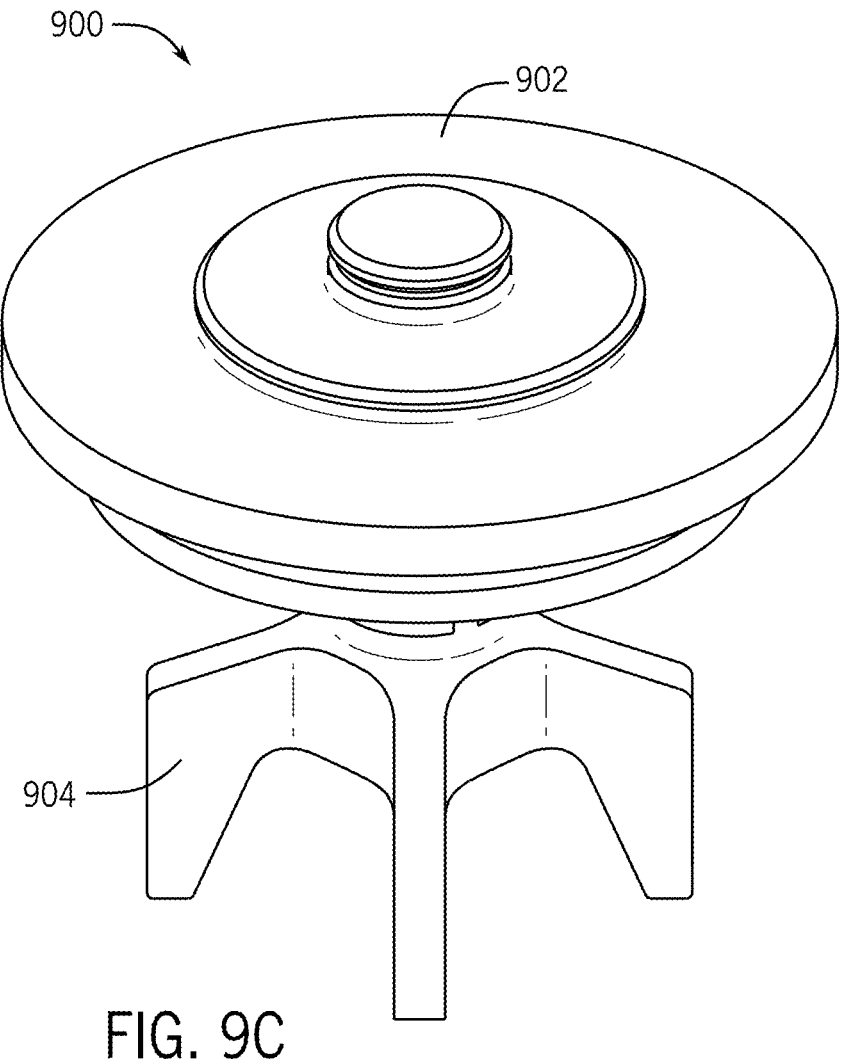
FIG. 9C is a top perspective view of an embodiment of a valve member, in accordance with embodiments of the present disclosure.

FIG. 9B is an exploded view of the upper portion 902 and the guide legs 904 and FIG. 9C is a top perspective view of the valve member 900 illustrating the upper portion 902 and the guide legs 904. As shown, in FIG. 9B an extension 936 is illustrated extending radially away from the coupling member 930. In operation, the extension 936 is positioned within the entry 920 and moved along the curved portion 922 to engage the receptacle 924, thereby securing the guide legs 904 to the lower portion 902. It should be appreciated that one or more extensions 936 may be utilized in various embodiments. Furthermore, while a cylindrical extension is shown, other embodiments may include different shapes.

Figure 9D:
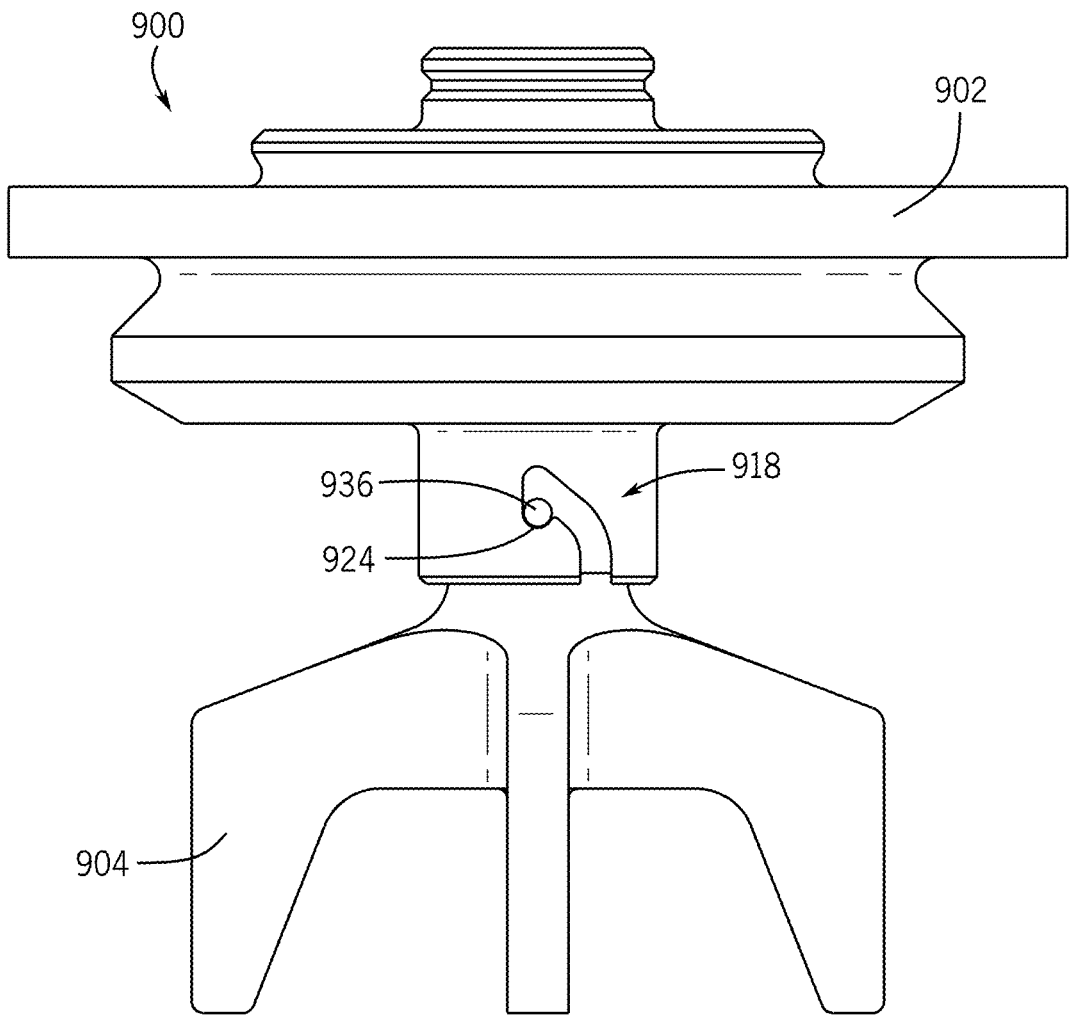
FIG. 9D is a side view of an embodiment of a valve member, in accordance with embodiments of the present disclosure.

FIG. 9D is a side view illustrating the valve member 900 in which the upper portion 902 is joined to the guide legs 904 such that the extension 936 engages the receptacle 924. In this example, the resilient member 934 (not pictured) drives the guide legs 904 in a downward direction, which applies a force to the extension 936 against the receptacle 924. Accordingly, rotation of the guide legs 904 relative to the upper portion 902 is blocked, securing the guide legs 904 to the upper portion 902. As noted above, various embodiments may include one or more connections, for example, multiple extensions 936 within multiple cutouts 918.

Figure 9E:
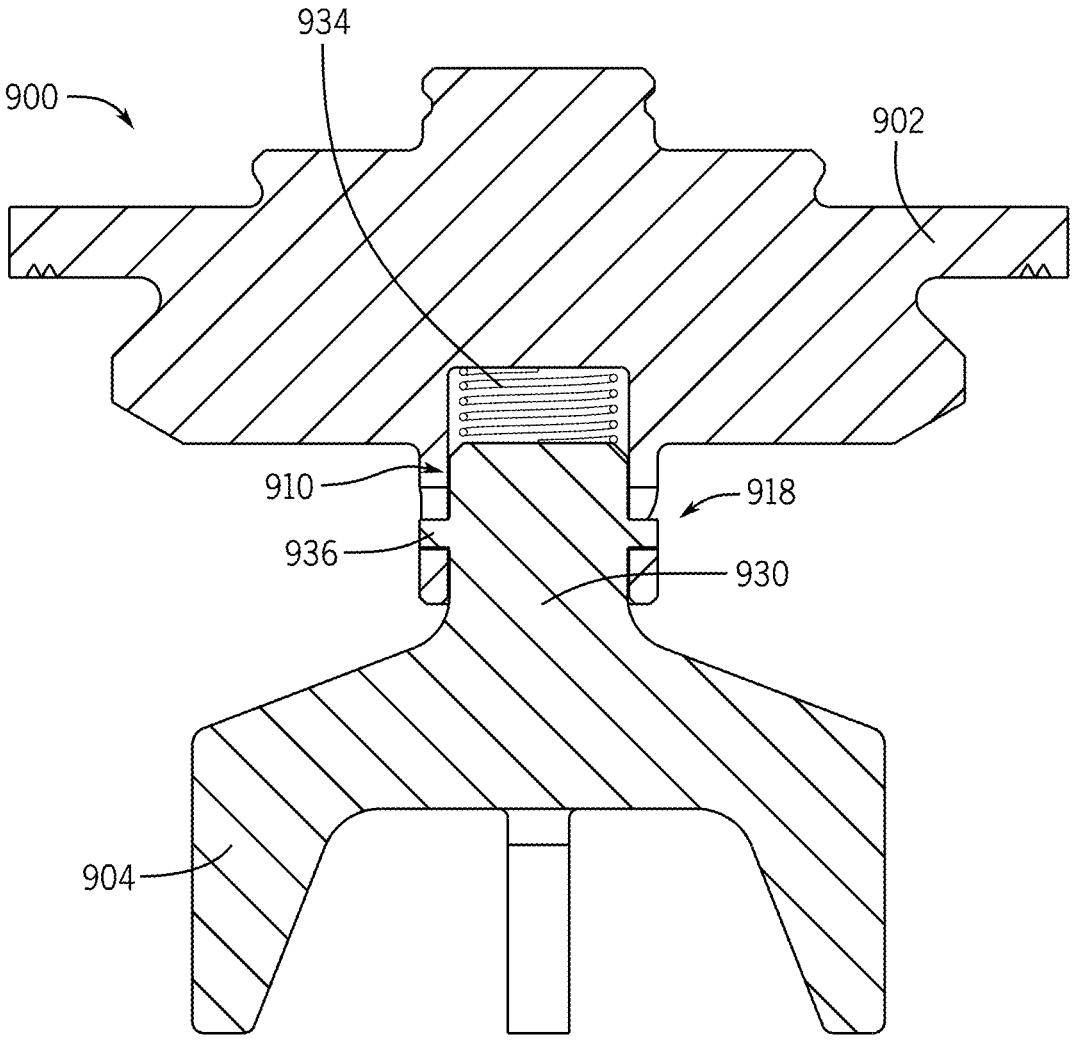
FIG. 9E is a cross sectional view of an embodiment of a valve member, in accordance with embodiments of the present disclosure.
Figure 9F:
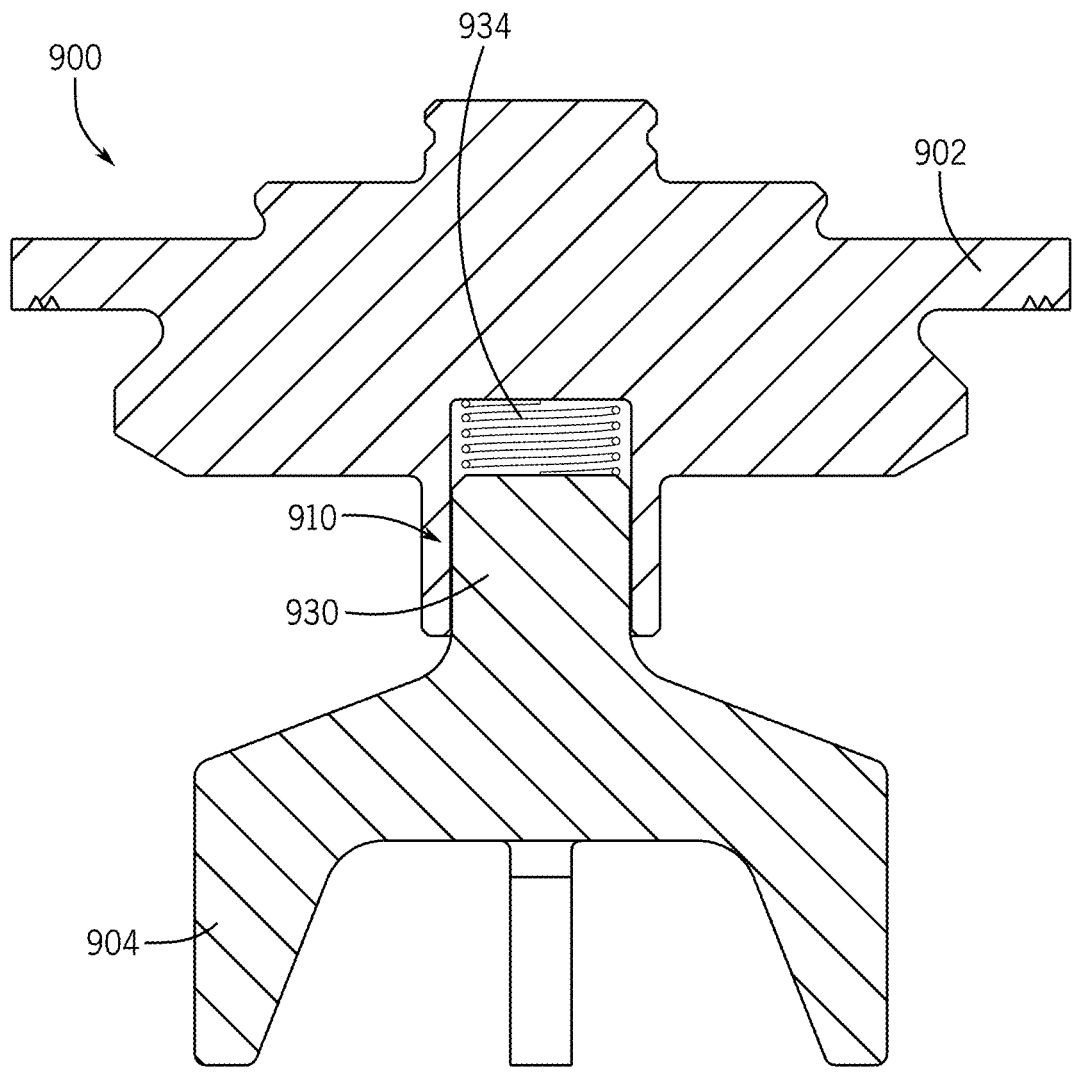
FIG. 9F is a cross sectional view of an embodiment of a valve member, in accordance with embodiments of the present disclosure.

FIGS. 9E and 9F are cross-sectional views illustrating the upper portion 902 joined to the guide legs 904. As illustrated, the coupling member 930 extends into the cavity 910 to secure the guide legs 904 to the upper portion 902 via engagement between the extensions 936 and the cutouts 918. In this example, there are two cutouts 918 and two extensions 936, but it should be appreciated that there may be more or fewer in various embodiments. Moreover, as noted above, the extensions 936 may be formed on the upper portion 902 while the cutouts 918 are formed on the guide legs 904 Upon being connected, the illustrated resilient member 934 applies a downward force to the guide legs 904 to drive the extension 936 against the upper portion 902, thereby securing the guide legs 904 to the upper portion 902.

It should be appreciated that one or more components described herein may be formed from a metallic material. Furthermore, one or more components may be formed from a non-metallic material. By way of example only, the upper portion 302 may be a metallic material while the guide legs 304 may be a metal, plastic, composite, or combination thereof.

This application is a continuation of U.S. Non-Provisional application Ser. No. 17/678,136, filed Feb. 23, 2022, titled "SYSTEM AND METHOD FOR VALVE ASSEMBLY," now U.S. Pat. No. 12,292,120, issued May 6, 2025, which claims the benefit of U.S. Provisional Patent Application No. 63/152,501, filed Feb. 23, 2021, titled "SYSTEM AND METHOD FOR VALVE ASSEMBLY," the full disclosures of which are hereby incorporated herein in their entireties by reference.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A valve member comprising:
(a) an upper portion having a body, a top side, a recess, and a cavity extending at least partially into the body, the cavity including:
a first portion having a first diameter, and
a second portion axially spaced by at least the first portion and having a second diameter greater than the first diameter;
(b) one or more guide legs comprising:
one or more legs, and
a coupling member extending axially from the one or more legs, the coupling member comprising a plurality of fingers extending from the one or more legs to flex radially inward responsive to a force driving the plurality of fingers within the first portion; and
(c) a sealing element positioned within the recess so that the upper portion connects to both the one or more guide legs and the sealing element, thereby to position the sealing element within the recess and to position the coupling member into the cavity.

2. The valve member of claim 1, wherein:
the plurality of fingers extend axially away from the one or more legs, and
the coupling member further comprises an extension of each finger of the plurality of fingers, each extension positioned radially outward with respect to a respective finger, and so that the plurality of fingers expand radially outward to position respective extensions on the shoulder when the respective extensions are aligned with the second portion.

3. The valve member of claim 1, wherein the cavity and the coupling member are joined via an interference fit.

4. The valve member of claim 1, wherein the cavity further comprises a shoulder located at a transition between the first portion and the second portion, and
wherein at least a portion of the coupling member engages the shoulder when the coupling member is positioned within the cavity.

5. A valve member comprising:
(a) an upper portion comprising:
a top side,
an underside,
a recess positioned between the top side and the underside, and
a cavity extending at least partially into a body of the upper portion, the cavity arranged at the underside and having:
a first portion adjacent the underside, the first portion having a first diameter, and
a second portion axially spaced from the underside by at least the first portion and having a second diameter greater than the first diameter;
(b) one or more guide legs comprising:
one or more legs, and
a coupling member extending from the one or more legs, the coupling member comprising a plurality of fingers extending from the one or more legs to flex radially inward responsive to force, thereby to drive the plurality of fingers within the first portion; and
(c) a sealing element configured to be positioned within the recess so that the upper portion connects to the one or more guide legs or the sealing element when force is applied thereto.

6. The valve member of claim 5, wherein:
the cavity comprises a cavity shoulder at a transition between the first portion and the second portion,
the plurality of fingers extend away from the one or more legs and are biased in an outward direction,
the coupling member further comprises an extension located on each finger of the plurality of fingers, each extension having a greater extension radius and a respective finger radius, and so that the plurality of fingers expand radially outward to position respective extensions on the cavity shoulder when the respective extensions are aligned with the second portion.

7. The valve member of claim 5, wherein the cavity and the coupling member are joined via an interference fit.

8. A method for forming a valve member, the method comprising:
positioning one or more guide legs for connection to a carrier portion, the guide legs including a plurality of fingers extending therefrom;
positioning, axially spaced from the one or more guide legs, a sealing element;

positioning, axially spaced from the sealing element, the carrier portion; and applying force, thereby to flex the plurality of fingers radially inward, thereby to drive the guide legs, the sealing element, and the carrier portion into a mating relationship.

9. The method of claim 8, wherein the applying of the linear force results in the one or more guide legs connected to the carrier portion before the sealing element is connected to the carrier portion.

10. The method of claim 8, wherein the applying of the force results in an interference fit between the guide legs and the carrier portion.

11. The method of claim 8, wherein:

the carrier portion includes a cavity and the one or more guide legs includes a coupling member comprising the plurality of fingers, and the applying of the force results in the coupling member and the cavity engaging one another.

12. The method of claim 8, wherein the sealing element is positioned axially opposite the carrier portion relative to the one or more guide legs.

13. The method of claim 8, wherein the sealing element is positioned between the one or more guide legs and the carrier portion.

14. The method of claim 8, wherein the force comprises a downward direction applied to the carrier portion.

15. The method of claim 8, wherein the force comprises an upward direction applied to the guide legs.

16. A valve assembly comprising:

an upper portion to be connected to one or more guide legs, a cavity within one of the upper portion or the one or more guide legs, and a coupling member associated with the other of the upper portion or the one or more guide legs, the coupling member comprising a plurality of fingers to flex inward responsive to force driving the plurality of fingers, so that the upper portion couples to the one or more guide legs when force is applied thereto.

17. The valve assembly of claim 16, wherein:

the cavity has a first portion adjacent an opening of the cavity, the first portion having a first diameter, and a second portion axially spaced from the opening of the cavity by at least the first portion and having a second diameter greater than the first diameter, the cavity comprises a cavity shoulder at a transition between the first portion and the second portion, the plurality of fingers extend axially away from the guide legs and are biased in a radially outward direction, and the coupling member further comprises an extension located on each finger of the plurality of fingers, each extension having a greater extension radius and a respective finger radius, so that the plurality of fingers expand radially outward to position respective extensions on the cavity shoulder when the respective extensions are aligned with the second portion.

18. The valve assembly of claim 16, wherein the cavity and the coupling member are jointed via an interference fit.

* * * * *